United States Patent
Aragones et al.

(10) Patent No.: US 7,944,380 B2
(45) Date of Patent: May 17, 2011

(54) WIRELESS LOCAL AREA NETWORK DEVICE SUPPORTING ENHANCED CALL FUNCTIONS

(75) Inventors: Charles T. Aragones, Los Angeles, CA (US); Sherman Lee, Rancho Palos Verdes, CA (US); Vivian Chou, Alhambra, CA (US)

(73) Assignee: Broadcom Corporation, Irvine, CA (US)

( * ) Notice: Subject to any disclaimer, the term of this patent is extended or adjusted under 35 U.S.C. 154(b) by 361 days.

(21) Appl. No.: 12/171,670

(22) Filed: Jul. 11, 2008

(65) Prior Publication Data

US 2008/0267155 A1 Oct. 30, 2008

Related U.S. Application Data

(63) Continuation of application No. 10/291,006, filed on Nov. 8, 2002, now Pat. No. 7,403,141.

(60) Provisional application No. 60/356,323, filed on Feb. 12, 2002, provisional application No. 60/394,327, filed on Jul. 8, 2002.

(51) Int. Cl.
*H03M 1/00* (2006.01)
(52) U.S. Cl. .................................. 341/126; 341/155
(58) Field of Classification Search .............. 341/126, 341/155, 144; 455/550.1
See application file for complete search history.

(56) References Cited

U.S. PATENT DOCUMENTS

| | | | |
|---|---|---|---|
| 7,010,300 B1* | 3/2006 | Jones et al. | 455/439 |
| 7,272,397 B2* | 9/2007 | Gallagher et al. | 455/436 |
| 2007/0133817 A1* | 6/2007 | Liu et al. | 381/77 |

* cited by examiner

*Primary Examiner* — Brian Young
(74) *Attorney, Agent, or Firm* — Garlick Harrison & Markison; Bruce E. Garlick

(57) ABSTRACT

A wireless local area network (WLAN) transceiving integrated circuit services voice communications in a WLAN with at least one other wireless device and includes a WLAN interface, a transcoder, and a switch box. The WLAN interface wirelessly communicates with at least one wireless device to receive inbound packetized audio data from the at least one wireless device and to transmit outbound packetized audio data to the at least one wireless device. The transcoder receives the inbound packetized audio data and converts the inbound packetized audio data to inbound Pulse Code Modulated (PCM) WLAN audio data. The WLAN interface also receives outbound PCM WLAN audio data and converts the outbound PCM WLAN audio data to the outbound packetized audio data. The switch box operably couples between the transcoder and a PCM bus, to which an audio COder/DEcoder (CODEC) couples. A speaker and a microphone coupled to the audio CODEC. The switch box enables the wireless transceiving integrated circuit to perform call conferencing operations, call forwarding operations, call hold operations, call muting operations, and call waiting operations.

20 Claims, 17 Drawing Sheets

WIRELESS LOCAL AREA NETWORK DEVICE SUPPORTING ENHANCED CALL FUNCTIONS

CROSS REFERENCES TO PRIORITY APPLICATIONS

This application is a continuation of U.S. application Ser. No. 10/291,006, filed Nov. 8, 2002, now issued as U.S. Pat. No. 7,403,141, which claims priority to U.S. Provisional Application Ser. No. 60/356,323, filed Feb. 12, 2002, and to U.S. Provisional Application Ser. No. 60/394,327, filed Jul. 8, 2002, the disclosures of all of which are incorporated herein by reference in their entirety for all purposes.

FIELD OF THE INVENTION

The present invention relates to wireless communications; and more particularly to operations by a Wireless Local Area Network device.

BACKGROUND OF THE INVENTION

The number and popularity of wireless communications devices in use continues to rise rapidly all over the world. Not only have cellular telephones become very popular, but Wireless Local Area Networking (WLAN) devices have also proliferated. One standard for wireless networking, which has been widely accepted, is the Specification of the Bluetooth System, v. 1.0 ("Bluetooth Specification"). The Bluetooth Specification enables the creation of small personal area networks (PAN's), where the typical operating range of a device is 100 meters or less. In a Bluetooth system, Bluetooth devices sharing a common channel sequence form a piconet. Two or more piconets co-located in the same area, with or without inter-piconet communications, is known as a scatternet.

The Bluetooth Specification supports voice communications between Bluetooth enabled devices. When a pair of Bluetooth devices support voice communication, the voice communications must be wirelessly supported in a continuous fashion so that carried voice signals are of an acceptable quality. Unexpected gaps, e.g., dropped packets, on the wireless link between supported Bluetooth devices causes degradation in the voice communication resulting in popping, static, or other unpleasant audible event. This problem is especially troublesome with Bluetooth devices since, in some operations, the communication link will regularly drop packets that carry the voice signals.

A further shortcoming of such operations relates to the manner in which packetized audio data is transmitted between Bluetooth devices. Consider an operation in which a first Bluetooth device transmits packetized audio data to a second Bluetooth device for presentation to a user. Because the Bluetooth WLAN supports data rates greatly in excess of those required for satisfactory voice service, each transmission from the first Bluetooth device carries a relatively large amount of packetized audio data. The duration of this transmission is typically small compared to the duration over which the second Bluetooth device will present the packetized audio data (carried in the transmission) to the user. Thus, the second Bluetooth device buffers the received packetized audio data and presents the packetized audio data (in a converted form) over an appropriate time period. However, if the packetized audio data stored in the input buffer is fully consumed prior to receipt of another transmission from the first Bluetooth device, it will appear to the second Bluetooth device that packetized audio data is lost (or severely delayed), and the second Bluetooth device will provided degraded audio to the serviced user.

Still another limitation relates to the manner which Bluetooth devices service voice communications. In most cases, the Bluetooth device is simply a replacement for a wired headset. Such a use of the Bluetooth device, while providing benefits in mobility of the user, provides little additional benefit over wired devices. Because other wireless solutions provide many of the benefits that current Bluetooth devices provide in servicing voice communications, the needs for the complexities of the Bluetooth specification are questioned.

Thus, there is a need for improved operations by wireless devices servicing voice communications that provide additional user functionality and improved service quality.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION

Figure 1:
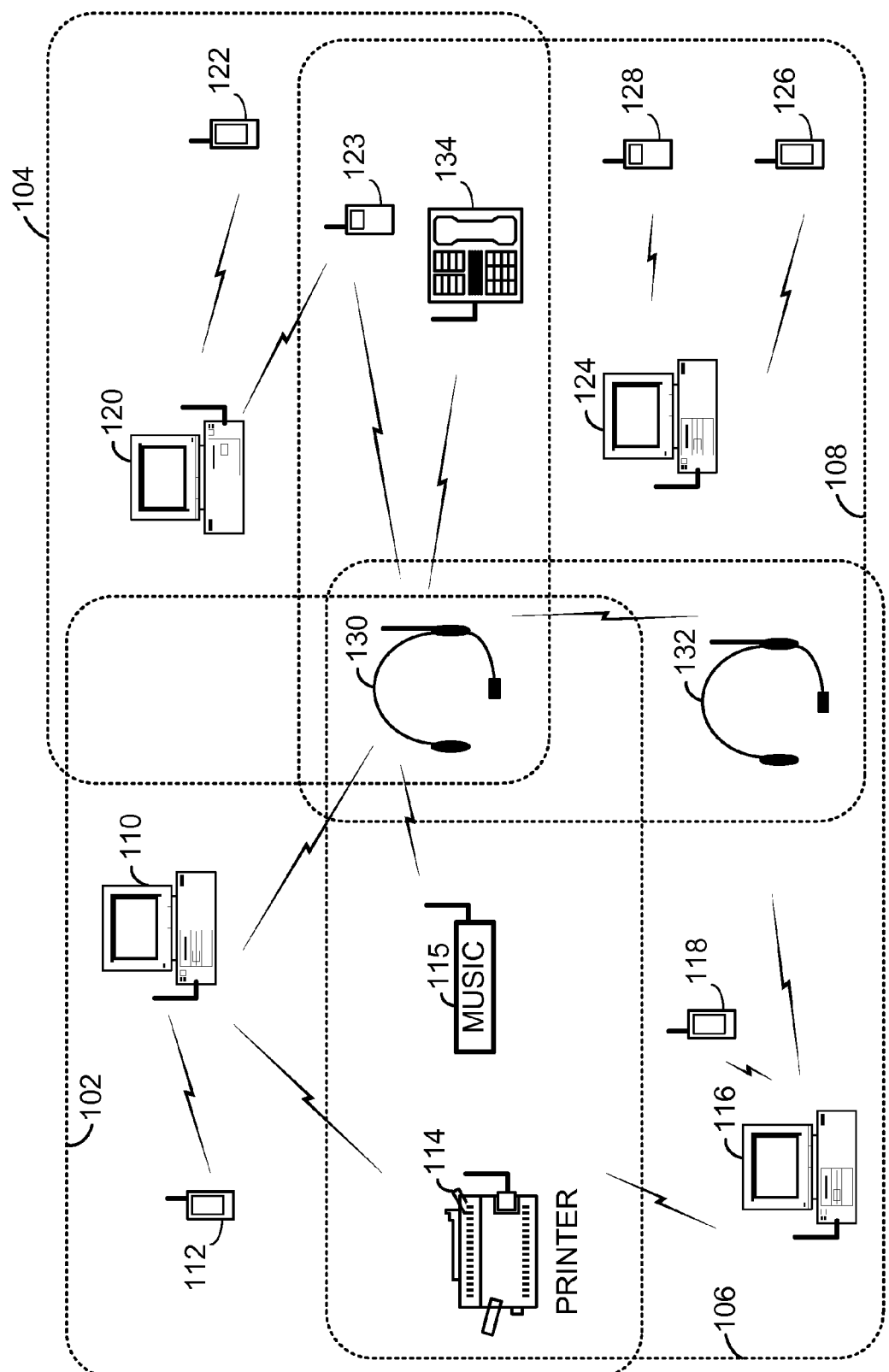
FIG. 1 is a system diagram illustrating a plurality of Wireless Local Area Network (WLAN) devices, some of which have installed therein wireless transceiving integrated circuit constructed according to the present invention.

FIG. 1 is a system diagram illustrating a plurality of Wireless Local Area Network (WLAN) devices, some of which have installed therein wireless transceiving integrated circuit constructed according to the present invention. Each of these wireless devices supports one or more versions of the Bluetooth Specification. A Bluetooth "scatternet" is formed from multiple "piconets" with overlapping coverage. The scatternet of FIG. 1 includes four separate piconets 102, 104, 106, and 108. Piconet 102 includes master (computer) 110, slave 112 (PDA), slave 114 (printer), slave 130 (wireless headset), and slave 115 (music source). Piconet 104 includes master 120 (computer), slave 122 (PDA), slave 123 (wireless phone), slave 130 (wireless headset), and slave 134 (landline phone). Piconet 106 includes master (computer) 116, slave 118 (PDA), slave 114 (printer), slave 130 (wireless headset), and slave 132 (wireless headset). Piconet 108 includes master (computer) 124, slave 126 (PDA), slave 128 (wireless phone, e.g., WLAN phone, cell phone, etc.), slave 132 (wireless headset), and slave 130 (wireless headset). The four separate piconets 102, 104, 106, and 108 have overlapping coverage areas. In the embodiment of FIG. 1, all masters are shown to be computers because they will typically be stationary and have the processing capability to service a number of slaves. However, in other embodiments, the masters could be other devices as well. The scatternet of FIG. 1 may service a call center, customer service department, or other office environment, for example that benefits by the wireless interconnection of the illustrated devices.

A user of wireless headset 130 (or 132) may establish communications with any wireless device in a piconet of which the wireless headset 130 (or 132) is also a member. The wireless headset 130 may have a minimal user interface, e.g., a single authenticate button that initiates joining of a piconet. However, the wireless headset 130, in its operating location, resides within the service coverage area of each of the four separate piconets 102, 104, 106, and 108 that form the scatternet. Thus, when the wireless headset 130 enters (or powers up in) an area with more than one functioning piconet, a user of the wireless headset 130 depresses an authenticate button to start the authentication process. With the authenticate button depressed, the wireless headset attempts to join one of piconets 102, 104, 106, and 108. Subsequent authentication operations are required to have the wireless headset join the selected piconet. These subsequent authentication operations may include prompting the user for selection of the piconet, requiring that entry be made on the home computer 110 to allow the wireless headset 130 to join the piconet 102, or other authentication operations. Likewise, the wireless headset 132 joins piconet 106 by performing appropriate authentication operations with master (computer 116) of piconet 106.

Once a wireless headset, e.g., 130 or 132 joins a respective piconet, 102 or 106, the wireless headset establishes an audio link with one or more of the members of the piconet via respective WLAN links. In particular, when the wireless headset 130 serves within a call center of FIG. 1, for example, an attendant using the wireless headset 130 services calls of the call center. Such calls will be received and managed by the computer 110 in the example. Likewise, the user of wireless headset 132 will work in conjunction with the computer 116 to service calls for the call center.

Each of the wireless devices illustrated in FIG. 1 may include a wireless transceiving integrated circuit constructed according to the present invention. As will be described further herein with reference to FIGS. 3A-10, the wireless transceiving integrated circuit supports enhanced call functions. These enhanced call functions include call conferencing operations, call forwarding operations, call hold operations, call muting operations, and call waiting operations.

Figure 2A:
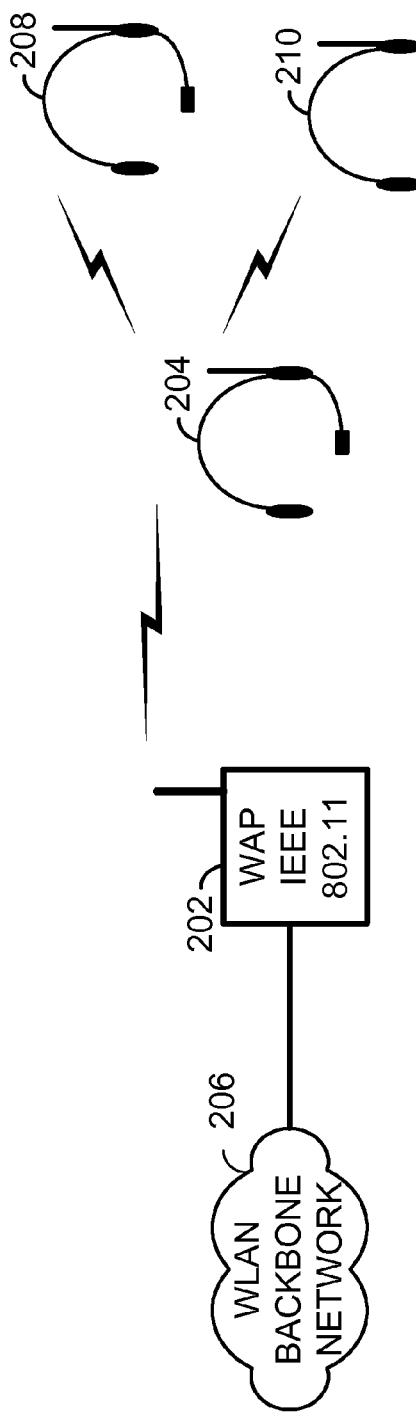
FIG. 2A is a system diagram illustrating the interaction between a plurality of wireless devices constructed according to the present invention and a Wireless Access Point (WAP)

FIG. 2A is a system diagram illustrating the interaction between a plurality of wireless devices 204, 208, and 210 constructed according to the present invention and a Wireless Access Point (WAP) 202. In the embodiment of FIG. 2A, the wireless headset 204 is Bluetooth compliant and/or IEEE 802.11 compliant, e.g., IEEE 802.11a, IEEE 802.11b, IEEE 802.11g, etc. In such case, the wireless headset 204 establishes a voice communication via the WAP 202 with another device also serviced by the WAP 202, or, more likely, with another device couple to the WAP 202 via the Wireless Local Area Network (WLAN) backbone network 206. Further, the wireless headset 204 services voice communications with two additional wireless headsets 208 and 210. According to the present invention, the wireless headset 204 supports call conferencing operations, call forwarding operations, call hold operations, call muting operations, and call waiting operations for ongoing calls serviced with the wireless headsets 208 and 210 and the WAP 202.

Figure 2B:
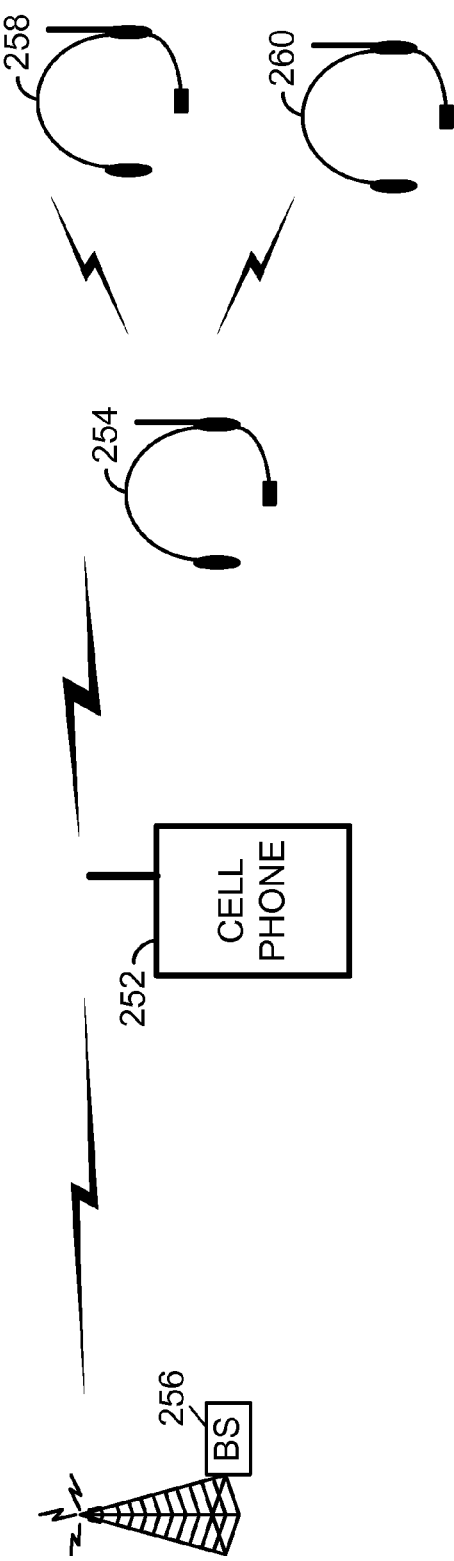
FIG. 2B is a system diagram illustrating the interaction between wireless headsets, a cell phone, and a cellular base station according to the present invention.

FIG. 2B is a system diagram illustrating the interaction between wireless headsets 254, 258, and 260, a cell phone 252, and a cellular base station 256. The cell phone 252 establishes a cellular telephone call via the base station 256 with another wireless device or with a wired device that couples to the base station 256 via a wired connection. The cell phone 252 operates according to a cellular operating standard, e.g., IS-95A, IS-95B, IS-136, GSM, 1xRTT, 1xEV, UMTS, etc. The cell phone 252 also supports the Bluetooth specification and communications with the wireless headset 254 via Bluetooth operations. The wireless headset 254 supports communications with wireless headsets 258 and 260 also via the Bluetooth operations. Thus, for example, the user of the wireless headset 254, while operating a vehicle may use the wireless headset 254 for audio communications serviced by the cell phone 252. However, usage of the components of FIG. 2B is not limited to a vehicular application. According to the present invention, the wireless headset 254 supports call conferencing operations, call forwarding operations, call hold operations, call muting operations, and call waiting operations for ongoing calls serviced with the wireless headsets 258 and 260 and the cell phone 252.

Figure 3A:
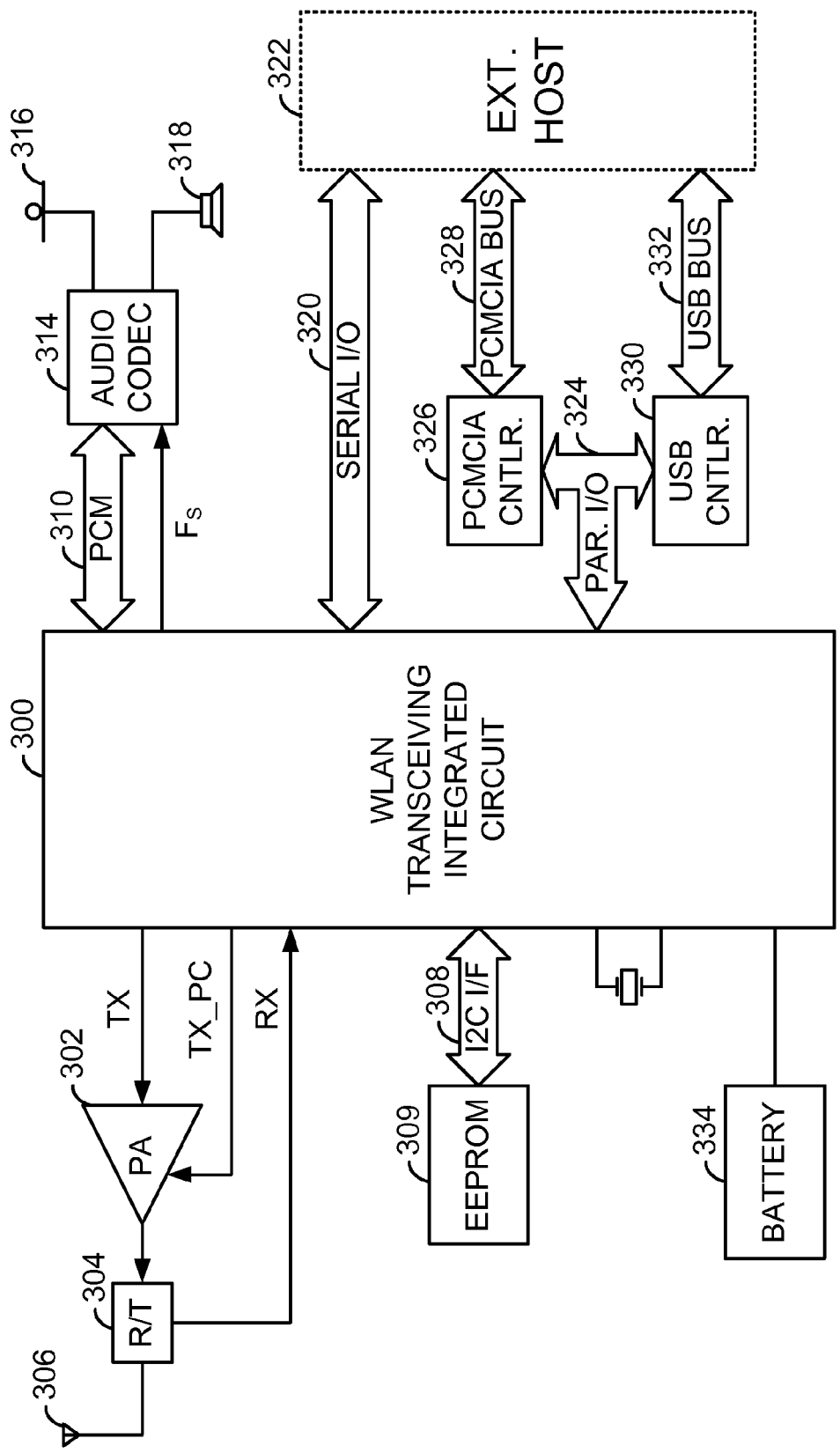
FIG. 3A is a block diagram illustrating the electrical components of a wireless headset that includes a first embodiment of a wireless transceiving integrated circuit constructed according to the present invention.

FIG. 3A is a block diagram illustrating the electrical components of a wireless headset that includes a first embodiment of a wireless transceiving integrated circuit constructed according to the present invention. The wireless headset includes the wireless transceiving integrated circuit 300 and a number of supporting components. The Radio Frequency (RF) interface for the wireless transceiving integrated circuit 300 includes a Power Amplifier (PA) 302, a Receive/Transmit switch 304, and an antenna 306. The power supply for wireless headset is a battery 334 that couples to the wireless transceiving integrated circuit 300 and also couples to other components of the wireless headset. The wireless transceiving integrated circuit 300 includes a plurality of interfaces that adhere to standardized interface formats. These interfaces include an I2C interface 308 that may couple the wireless transceiving integrated circuit 300 to an EEPROM 309. A Pulse Code Modulated (PCM) connection 310 couples the wireless transceiving integrated circuit 300 to an audio Coder-Decoder (CODEC) 314 that performs coding/decoding operations. The PCM connection 310 includes a PCM synchronization signal, $F_S$. The audio CODEC 314 couples to a microphone 316 and to a speaker 318.

A serial I/O 320 may couple the wireless transceiving integrated circuit 300 to an external host 320. However, in the embodiment of FIG. 3, the wireless headset does not require an external host 320. A parallel I/O 324 may couple the wireless transceiving integrated circuit 300 to a PCMCIA controller 326 and to a USB controller 330 that my also couple the wireless transceiving integrated circuit 300 to the external host 320 via a PCMCIA bus 328 and a USB bus 332, respectively.

Figure 3B:
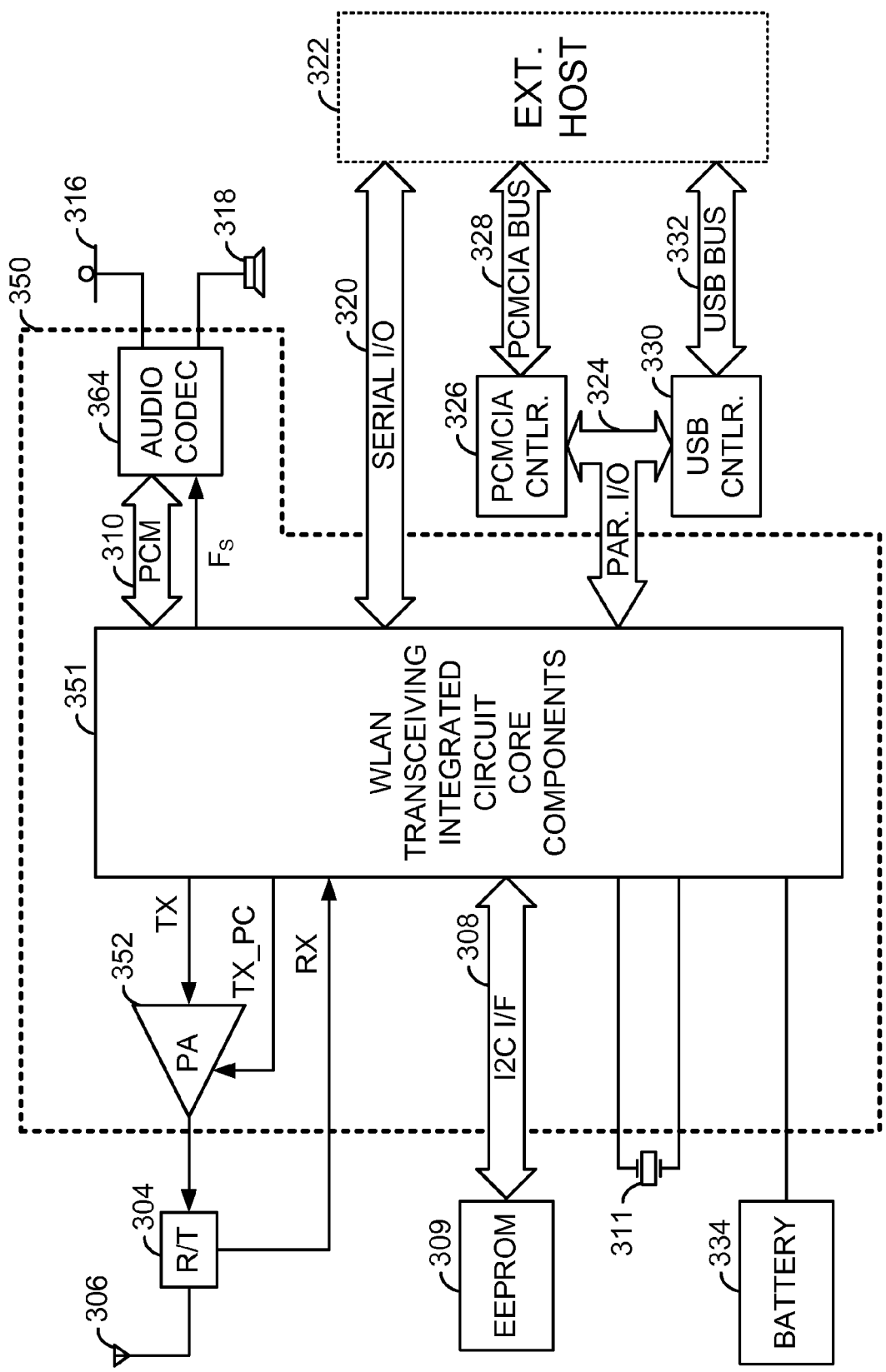
FIG. 3B is a block diagram illustrating the electrical components of a wireless headset that includes a second embodiment of a wireless transceiving integrated circuit constructed according to the present invention.

FIG. 3B is a block diagram illustrating the electrical components of a wireless headset that includes a second embodiment of a wireless transceiving integrated circuit constructed according to the present invention. The embodiment of FIG. 3B is similar to the embodiment of FIG. 3A except that the embodiment of FIG. 3B includes additional integration. With such integration, the PA 352 and audio CODEC 364 are on-chip and the remaining components of the wireless transceiving integrated circuit are referred to as wireless transceiving integrated circuit core components 351. In still another embodiment, the wireless transceiving integrated circuit includes an on-chip local oscillator and does not require an external crystal to provide a reference oscillation 311.

Figure 4A:
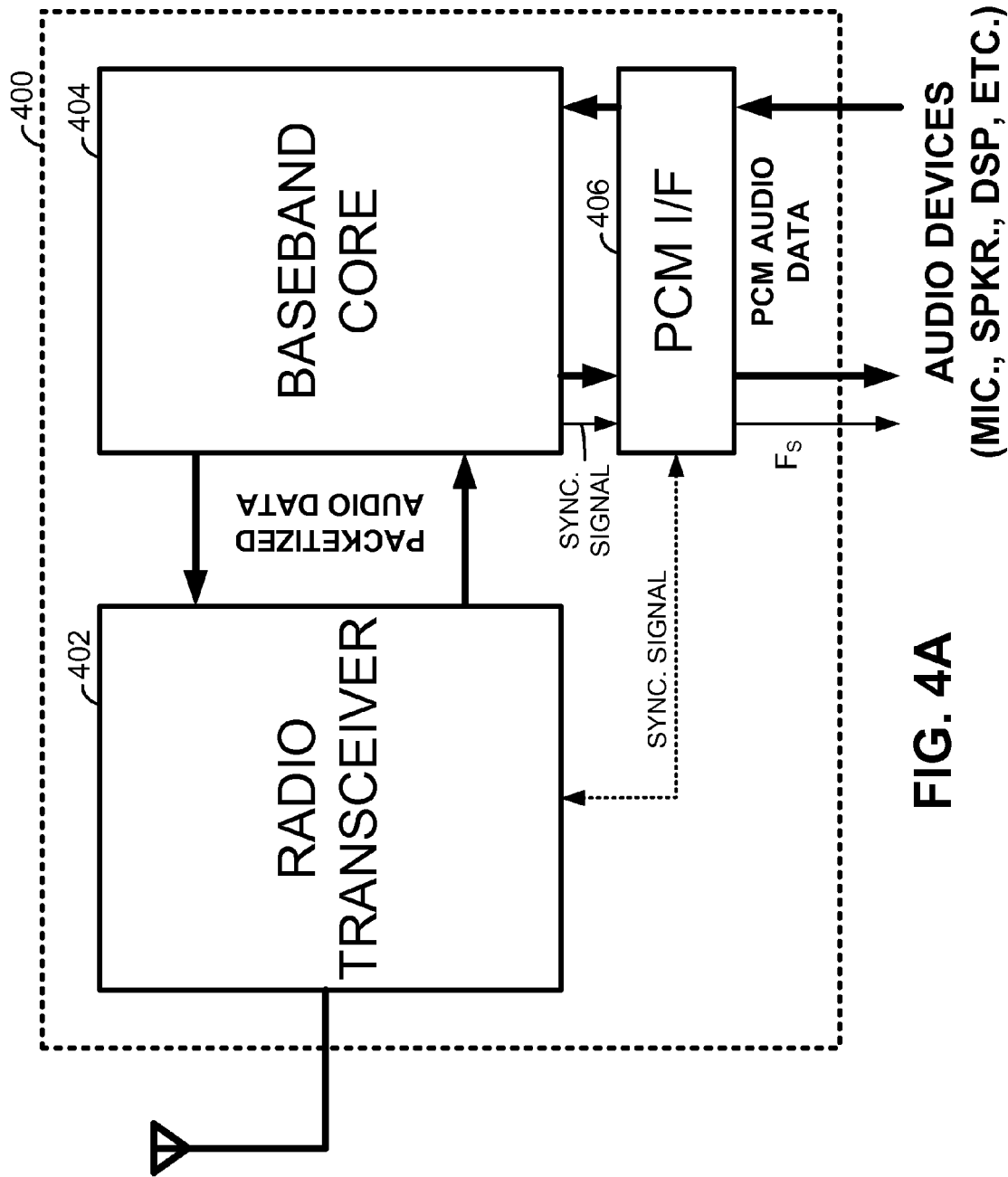
FIG. 4A is a block diagram generally illustrating the components of a wireless transceiving integrated circuit constructed according to the present invention.

FIG. 4A is a block diagram generally illustrating the components of a wireless transceiving integrated circuit constructed according to the present invention. The baseband processor 400 includes a radio transceiver 402, a baseband core (BBC) 404, and a PCM interface 406. The wireless transceiving integrated circuit 400 shown in FIG. 4A has an integrated radio transceiver 402 that has been optimized for use in 2.4 GHz Bluetooth wireless systems.

The BBC 404 implements the physical layer of the Bluetooth interface with other Bluetooth enabled wireless devices. The BBC 404 manages physical channels and links apart from other services like error correction, data whitening, hop selection and Bluetooth security. The BBC 404 implements the physical layer lies on top of the Bluetooth radio layer in the Bluetooth protocol stack. The baseband protocol is implemented as a Link Controller, which works with the link manager for carrying out link level routines like link connection and power control. The BBC 404 also manages asynchronous and synchronous links, handles packets and does paging and inquiry to access and inquire Bluetooth devices in the area. The baseband transceiver 400 applies a time-division duplex (TDD) scheme (alternate transmit and receive). Therefore apart from different hopping frequency (frequency division), the time is also slotted.

The BBC 404 supports 13 different packet types for the baseband layer of the Bluetooth system. All higher layers use these packets to compose higher level PDU's. The packets are ID, NULL, POLL, FHS, and DM1. These packets are defined for both SCO and ACL links. DH1, AUX1, DM3, DH3, DM5, DH5 packets are defined for ACL links only. HV1, HV2, HV3, and DV packets are defined for SCO links only. Each Bluetooth packet consists of 3 entities, an access code (68/72 bits), a header (54 bits), and a payload (0-2745 bits). The Access code is used for timing synchronization, offset compensation, paging and inquiry. There are three different types of Access codes: (1) the Channel Access Code (CAC); (2) the Device Access Code (DAC); and (3) the Inquiry Access Code (IAC). The channel access code identifies a unique piconet while the DAC is used for paging and its responses. The IAC is used for inquiry purpose. The header contains information for packet acknowledgement, packet numbering for out-of-order packet reordering, flow control, slave address and error check for header. Finally, the Payload contains a voice field, a data field or both. If the payload is a data field, the payload will also contain a payload header. In supporting voice communications, packetized audio data is carried between wireless devices in Bluetooth Specification Synchronous Connection Oriented (SCO) data packets.

The PCM I/F 406 couples to the baseband core 404 and produces PCM audio data and also a PCM synchronization signal, $F_S$. According to the present invention, the PCM synchronization signal, $F_S$ is temporally aligned with RF slots of the radio transceiver 402 that are produced by a servicing master wireless device. The PCM I/F 406 may receive the PCM synchronization signal, $F_S$, directly from the baseband core 404 or may construct the PCM synchronization signal, $F_S$, based upon a synchronization signal received from either/both of the radio transceiver 402 or/and the baseband core 404.

Figure 4B:
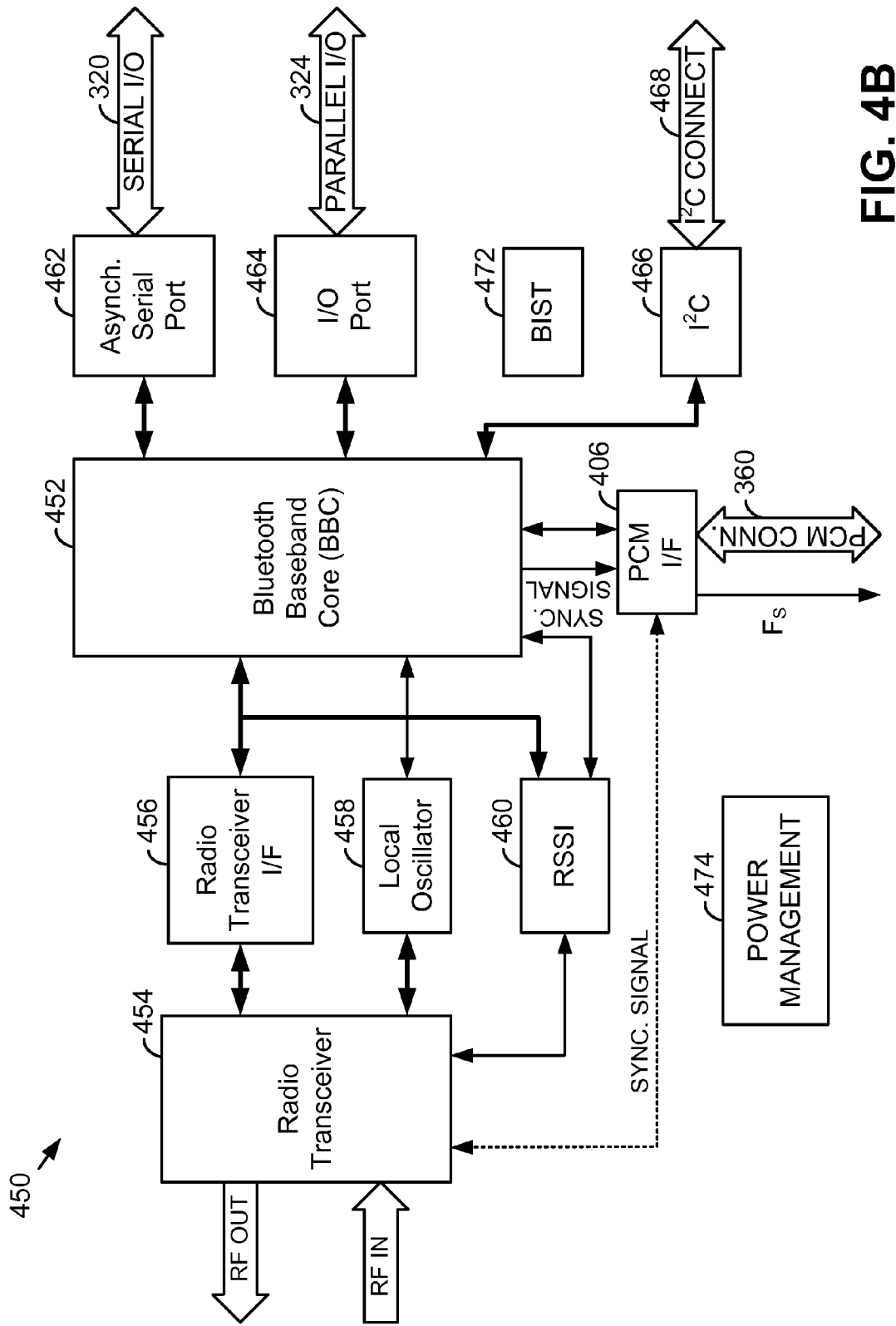
FIG. 4B is a block diagram generally illustrating in more detail the components of the wireless transceiving integrated circuit constructed according to the present invention of FIG. 4A.

FIG. 4B is a block diagram generally illustrating in more detail the components of the wireless transceiving integrated circuit 450 constructed according to the present invention of FIG. 4A. The radio transceiver 454 has been designed to provide low-power, low-cost, robust communications for applications operating in the globally available 2.4 GHz unlicensed ISM band. It is fully compliant with the Bluetooth RF specification Version 1.1 and meets or exceeds the requirements to provide the highest communication link quality service. In the receiver path, the radio transceiver 454 has a high-degree of linearity, an extended dynamic range, and high order on-chip channel filtering to ensure reliable operation in the noisy 2.4 GHz ISM band. The performance of the receiver chain is reflected in the IP3, co-channel interference, and out-of-band blocking specifications. The radio transceiver 402 includes a fully integrated transmitter. Baseband data received from the baseband core 404 is GFSK modulated and up-converted to the 2.4 GHz ISM band via an internal mixer. The radio transceiver 454 provides a normal power output of 0 dBm and has a power control signal provided by the wireless transceiving integrated circuit 300 that controls the PA 302 to provide 24 dBm of gain control in 8 dBm step size.

The radio transceiver 454 interfaces with the BBC 452 via a radio transceiver interface 456, a Local Oscillator (LO) 458, and a Received Signal Strength Indicator (RSSI) 460. The LO 458 provides fast frequency hopping (1600 hops/second) across the 79 maximum available Bluetooth channels. The radio transceiver 454 of the wireless transceiving integrated circuit 400 features on-chip calibration, eliminating process variation across components. This enables the wireless transceiving integrated circuit 450 to be used in high volume applications.

The wireless transceiving integrated circuit 450 parallel I/O interface 324 (coupled to the BBC 452 via an I/O port 464) can be operated in either Master or Slave mode. By default the wireless transceiving integrated circuit 400 will power up in one of the modes depending on the setting of MODE pins (not shown). In Master mode, the wireless transceiving integrated circuit 450 accesses peripheral devices on the parallel bus 324 in (1) 8-bit parallel I/O Normal A0 Read and Write modes; and (2) 8-bit parallel I/O Fast ALE Read and Write modes. In Slave mode, the parallel I/O bus interface 464 is intended to support a connection to a wide range of external host processors or external host controllers. Data transfer between an external host 322 and the BBC 452 is provided through transmitter and receiver FIFOs. The external host 322 can program and monitor the FIFO control and status registers. There are also additional external host accessible registers to provide the external host with abilities to dynamically configuring, controlling, and diagnosing the Bluetooth device. The Slave mode interface timing of the parallel bus 324 can be in one of: (1) 8-bit parallel I/O Normal A0 Read and Write modes; (2) 8-bit parallel I/O Fast A0 Read and Write modes; and (3) 8-bit parallel I/O Fast ALE Read and Write modes.

The asynchronous serial interface I/O 320 (coupled to the BBC 452 via an asynchronous serial port 462) enables an asynchronous serial data stream to communicate with the BBC 452 in a similar fashion as the slave mode parallel I/O interface. A programmable baud rate generator is provided to select, transmit and receive clock rates from 9600 bps to 921.6 Kbps. The default baud rate is determined by the setting of external selection pins BAUD[3:0] (not shown).

A master mode 2-wire serial interface bus is available on the wireless transceiving integrated circuit 450 to allow read and write operations from/to an I2C serial EEPROM 309 via the I2C interface 466 and the I2C connection 468. The BBC 452, via software instruction at power-on reset, sets the control of the I2C pins. At power-on reset the boot code that resides on the BBC 452 on-chip boot ROM monitors a controlled pin to determine the presence or absence of the serial EEPROM 309. If an EEPROM 309 is detected, the BBC 452 on chip boot code performs read operations from the EEPROM 309 that contains the fully operational microcode for the BBC 452. If the EEPROM 309 is not present, the BBC 452 expects the microcode to be downloaded from the external host. When the fully operational microcode is up and running, the external host can access the serial EEPROM 309 through an EEPROM Status and Control register. The BBC 452 implements all the high-level time critical Link Management functions in dedicated hardware under the control of the micro-sequencer. The BBC 452 hardware processes Bluetooth Link Control (LC) functions and manages Bluetooth slot usage. The external host 322 can use this register to manipulate the device pins in order to read and modify the EEPROM 309 contents as desired. The wireless transceiving integrated circuit further includes power management functions 474 and Built-In-Self Test 472 functions. The power management unit 474 provides power management features that are controlled through setting of the power management registers.

Figure 5:
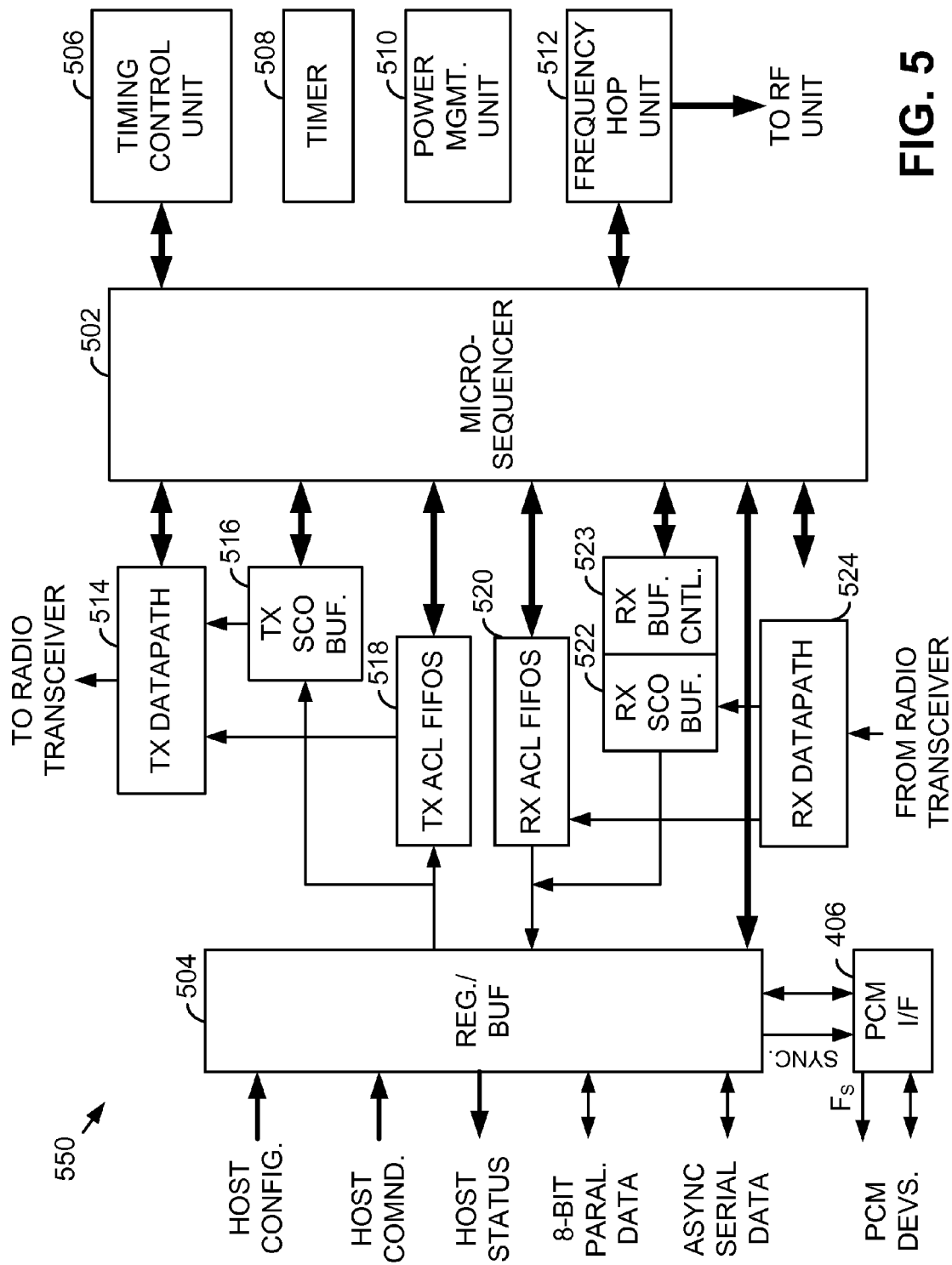
FIG. 5 is a block diagram illustrating the components of a Baseband Core of the wireless transceiving integrated circuit constructed according to the present invention of FIGS. 4A and 4B.

FIG. 5 is a block diagram illustrating the components of a Baseband Core (BBC) 550 of the wireless transceiving integrated circuit constructed according to the present invention of FIGS. 4A and 4B. The BBC 550 includes a microsequencer (processor) 502, a timing control unit 506, a timer 508, a power management unit 510, and a frequency hop unit 512. In the transmit path, the BBC 404 includes a TX data path 514 that couples to the radio transceiver, a TX SCO buffer (output buffer) 516, and TX ACL FIFOs 518. In the receive path, the BBC 550 includes an RX data path 524 that couples to the radio transceiver, an RX SCO input buffer 522, and an RX ACL FIFO 520. These components service the receive path for the BBC 550. The registers/buffers 504 receive external host configuration data, external host command data, provide status to the external host, and interface with the external host via the parallel and serial buses. The registers/buffers 504 also interface with the audio CODEC 314 via a PCM interface 406. An input buffer controller 523 operably couples to the input buffer 522 and to the processor 502.

Figure 6:
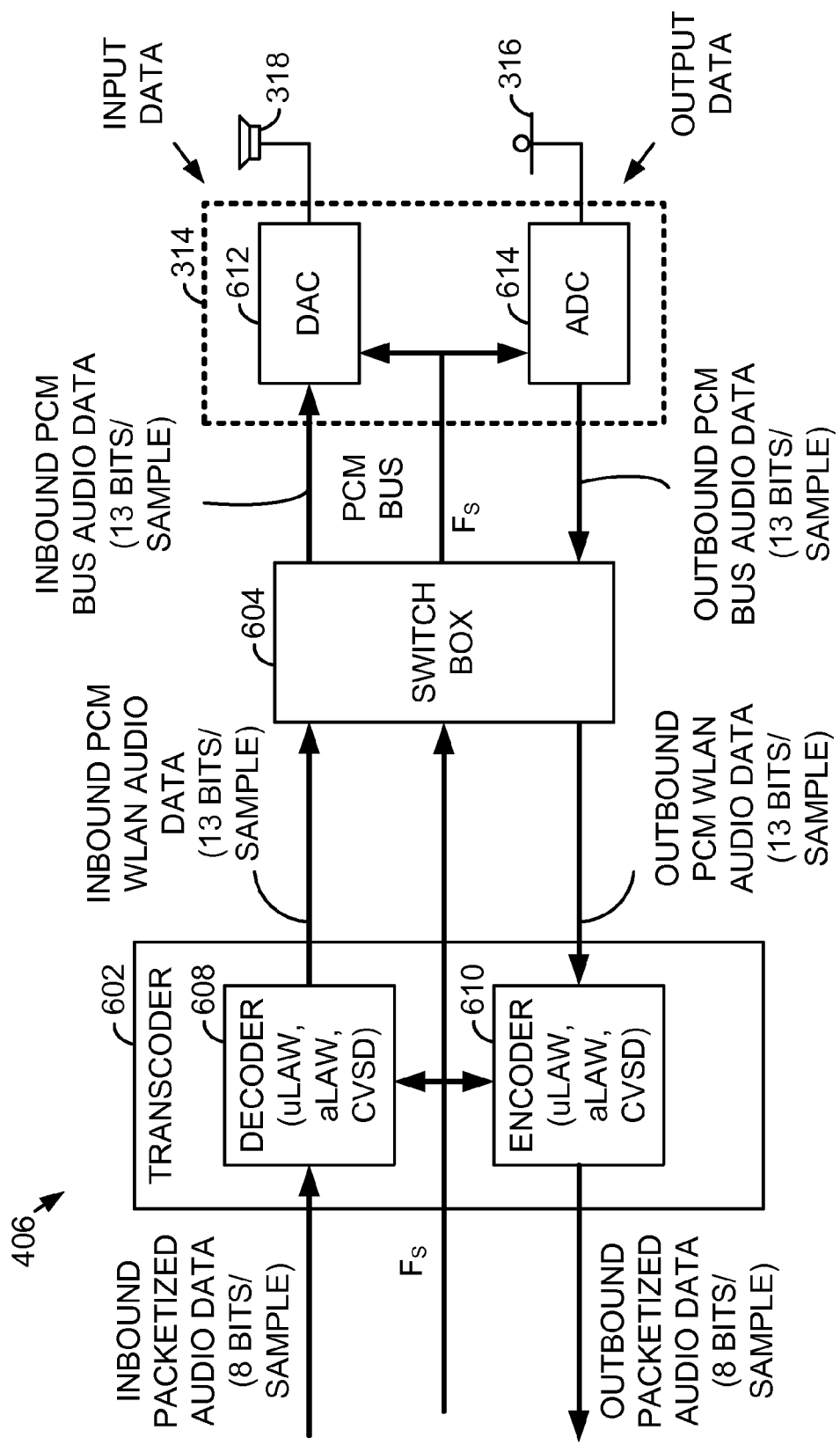
FIG. 6 is a block diagram generally illustrating the components of a Pulse Code Modulated (PCM) interface of the Baseband Core of FIG. 5.

FIG. 6 is a block diagram generally illustrating the components of a Pulse Code Modulated (PCM) interface 406 of the Baseband Core 550 of FIG. 5. The PCM interface 406 includes a transcoder 602 having a decoder 608 and an encoder 610, a switch box 604 and an audio CODEC 314. Coupled to the audio CODEC 314 are a speaker 318 and a microphone 316. As shown, the audio CODEC 314 includes a Digital-to-Analog-Converter (DAC) 614 that converts PCM audio data to an analog audio signal and provides the analog audio signal to a speaker 318. Further, as is shown, the audio CODEC 314 includes an Analog-to-Digital-Converter (ADC) 614 that receives an analog audio signal from the coupled microphone 316 and converts the analog audio signal to PCM audio data.

The transcoder 602 converts packetized audio data (encoded) that is suitable for the WLAN interface to PCM audio data that is suitable for the audio CODEC 314, and vice versa. In particular, the decoder 608 converts encoded packetized audio data to PCM audio data while the encoder 610 converts PCM audio data to encoded packetized audio data. In one embodiment, the transcoder 602 supports 13-bit linear PCM CODEC devices with a 2's complement serial data format. It is capable of supporting an external audio clock or outputting an audio clock (ACLK) in multiples of 128 KHz, from 128 KHz to 4096 KHz. In an audio master mode, the PCM I/F 406 can generate PCM audio data in an 8 KHz short/long Frame Sync (ASYNC) format. In an audio slave mode, the PCM I/F 406 can receive PCM audio data in an 8 KHz short Frame Sync format.

The PCM I/F 406 supports up to three SCO channels, and in at least one embodiment, the PCM audio data is Time Division Multiplexed (TDM) into slots within every ASYNC period. Each of the three SCO channels can be assigned to any TDM slot. The TDM slots can be programmed from one to 16 slots depending on the ACLK rate. In PCM Master mode, and for systems that don't support TDM, the two additional SCO channels are available using GPIO6 and GPIO7 as the PCM Frame Sync signals (i.e., ASYNC3 and ASYNC2, respectively).

The transcoder 602 can process each SCO channel with A-law operations, µ-law operations, or Continuous Variable Slope Delta (CVSD) operations. The appropriate voice-coding scheme is selected after negotiations between the Link Managers of the communicating wireless devices. On the Bluetooth air-interface, either a 64 kb/s log PCM format (A-law or µ-law) is used, or a 64 kb/s CVSD is used. The latter format applies an adaptive delta modulation algorithm with syllabic companding. The voice coding on the PCM I/F 406 should have a quality equal to or better than the quality of 64 kb/s log PCM. Since the voice channels on the air-interface can support a 64 kb/s information stream, a 64 kb/s log PCM traffic can be used for transmission. Either A-law or µ-law compression can be applied. In the event that the line interface uses A-law and the air interface uses µ-law or vice versa, a conversion from A-law to µ-law is performed. The compression method follows ITU-T recommendations G. 711.

A more robust format for voice over the air interface is a delta modulation. This modulation scheme follows the waveform where the output bits indicate whether the prediction value is smaller or larger then the input waveform. To reduce slope overload effects, syllabic companding is applied: the step size is adapted according to the average signal slope. The input to the encoder 610 (when performing CVSD operations) is 64 kilo-samples/sec linear PCM. An on-chip voice switch box 604 of the PCM I/F 406 provides features such as N-ways conference calling, call forwarding, call waiting, call muting, and call holding, etc.

In the embodiment of FIG. 6, the PCM I/F 406 receives the PCM synchronization signal, $F_S$, from another component of the wireless transceiving integrated circuit, e.g., the baseband processor or the WLAN interface. The PCM I/F 406 performs decoding and encoding operations based upon the PCM synchronization signal, $F_S$. Further, the PCM I/F 406 performs switch box operations based upon the PCM synchronization signal, $F_S$, and also provides the signal to the DAC 612 and the ADC 614 that operate according to the PCM synchronization signal, $F_S$.

Figure 7:
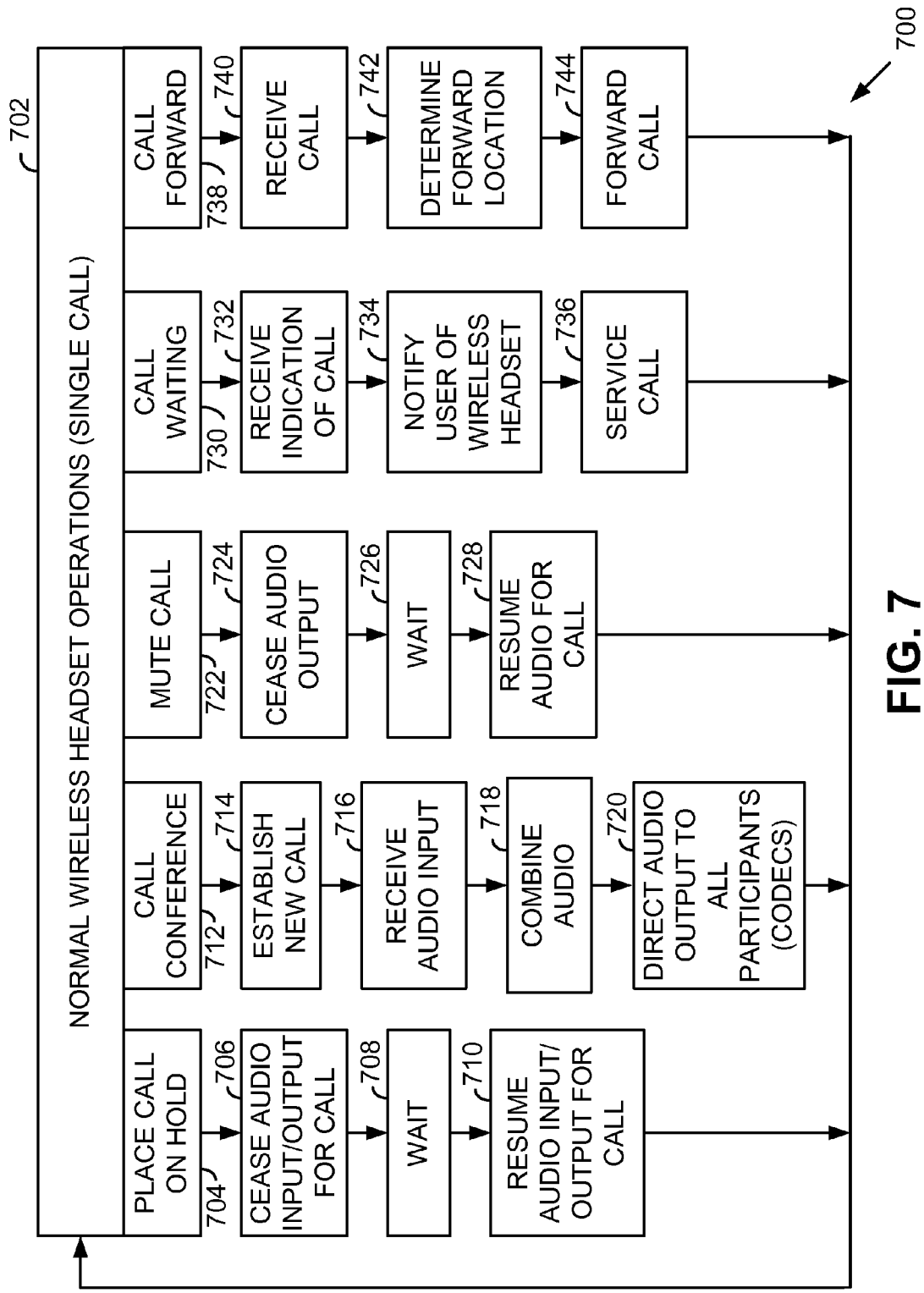
FIG. 7 is a logic diagram illustrating operation of a wireless headset constructed according to the present invention in performing enhanced call management.

FIG. 7 is a logic diagram illustrating operation of a wireless headset constructed according to the present invention in performing enhanced call management. The operations described with reference to FIG. 7 are performed in part by the on-chip voice switch box 604 of the PCM interface 406 of FIGS. 4A, 4B, and 5. During normal operations, the wireless headset services normal operations, e.g., single call.

One particular operation that the wireless headset may perform is to place a call on hold (step 704). In such case, the wireless headset ceases producing audio input and audio output for the call (step 706). These operations are continued during a wait state (step 708) until normal operations are resumed for the call (step 710). From step 710, operation proceeds to step 702. The call hold operations of steps 704-710 may be performed in conjunction with the other operations of FIG. 7, e.g., call waiting, call muting, call conferencing, etc.

Call conferencing (step 712) may be initiated by the wireless headset, or by a master device if the wireless headset does not have sufficient user interface for call conferencing initiation. In such case, a new call is established by the wireless headset (step 714). This new call may be serviced by the additional channels serviced by the wireless headset. As was previously described, the wireless headset supports multiple channels. Using this multiple channels, the wireless headset receives audio input from all participants (step 716) and combines the audio input, along with the input generated by the user of the wireless headset. The wireless headset then directs the combined audio to all participants (their servicing CODECs at step 720). Note that these operations are continually performed for the duration of the conference call.

The wireless headset may also mute calls (step 722). In such case, the wireless headset simply ceases all audio output (724) and waits for the user of the wireless headset to cease the muting operations (step 726). When the muting has been ceased, the wireless headset resumes the audio servicing of the call (step 728).

The wireless headset also performs call waiting operations (step 730). In such case, the wireless headset receives an indication that a call is inbound (step 732). However, instead of immediately servicing the call, the wireless headset notifies the user of the wireless headset of the call (step 734), e.g., provides a beeping indication to the user of the wireless headset. The wireless headset then services the call (step 736), at the direction of the user to either complete the call, have the call join a currently serviced call (via call conferencing operations in some cases), or to ignore the call.

The wireless headset may also perform call forwarding operations according to the present invention (step 738). In such case, the wireless headset receives the call (step 740). However, instead of servicing the call, the wireless headset determines a forwarding location for the call (step 742) and then forwards the call (step 744). Operation from steps 710, 720, 728, 736, and 744 return to step 702.

Figure 8A:
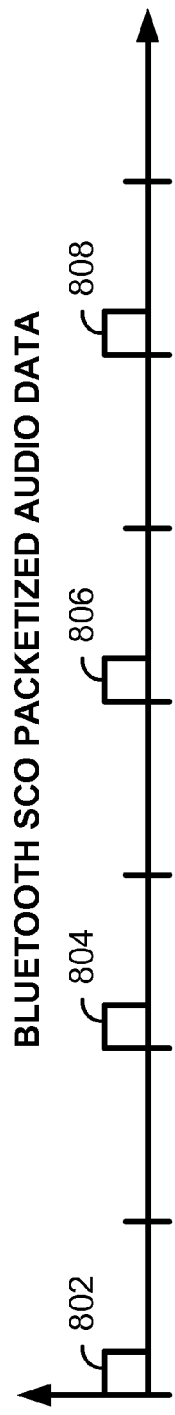
FIGS. 8A through 8D are graphs illustrating the production of PCM synchronization pulses and PCM audio data by the transcoder of the PCM interface of the wireless transceiving integrated circuit of the present invention.

FIGS. 8A through 8D are graphs illustrating the production of PCM synchronization pulses and PCM audio data by the transcoder of the PCM interface of the wireless transceiving integrated circuit of the present invention. FIG. 8A illustrates the receipt of packetized audio data by the WLAN interface of the wireless transceiving integrated circuit of the present invention. As shown, the WLAN interface periodically receives packetized audio data in SCO packets, e.g., packets 802, 804, 806, and 808.

Figure 8B:
Figure 8C:
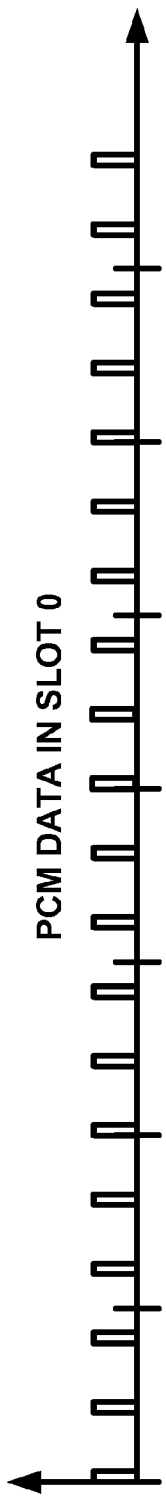
Figure 8D:
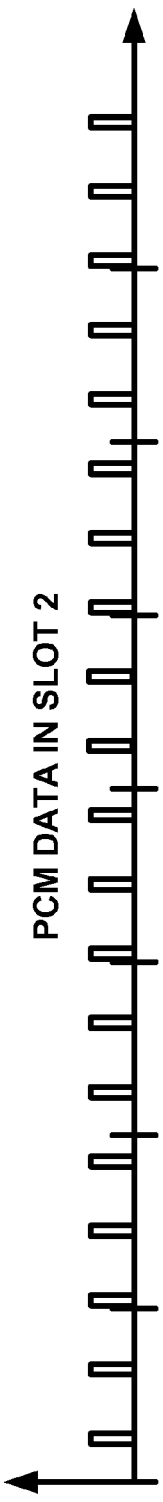

FIG. 8B illustrates the production of PCM synchronization pulses, Fs, by the PCM interface of the wireless transceiving integrated circuit of the present invention. FIGS. 8B and 8C illustrate the manner in which PCM data is produced by the transcoder in differing Time Division Multiplexed (TDM) slots on the PCM bus. As is shown, the PCM data of FIG. 8C resides in slot 0 and is time aligned with the PCM synchronization pulses, $F_S$, produced by the PCM I/F. As is shown in FIG. 8D, PCM data in slot 2 of FIG. 8C while not time aligned with the synchronization pulses, $F_S$, is synchronized with the synchronization pulses, $F_S$. The PCM bus illustrated in FIGS. 8A-8D created by the PCM I/F supports 4 slots. However, in other embodiments, a differing numbers of slots may be supported by the TDM bus, e.g., 2 slots, 8 slots, 16 slots, 32 slots, etc.

Figure 9:
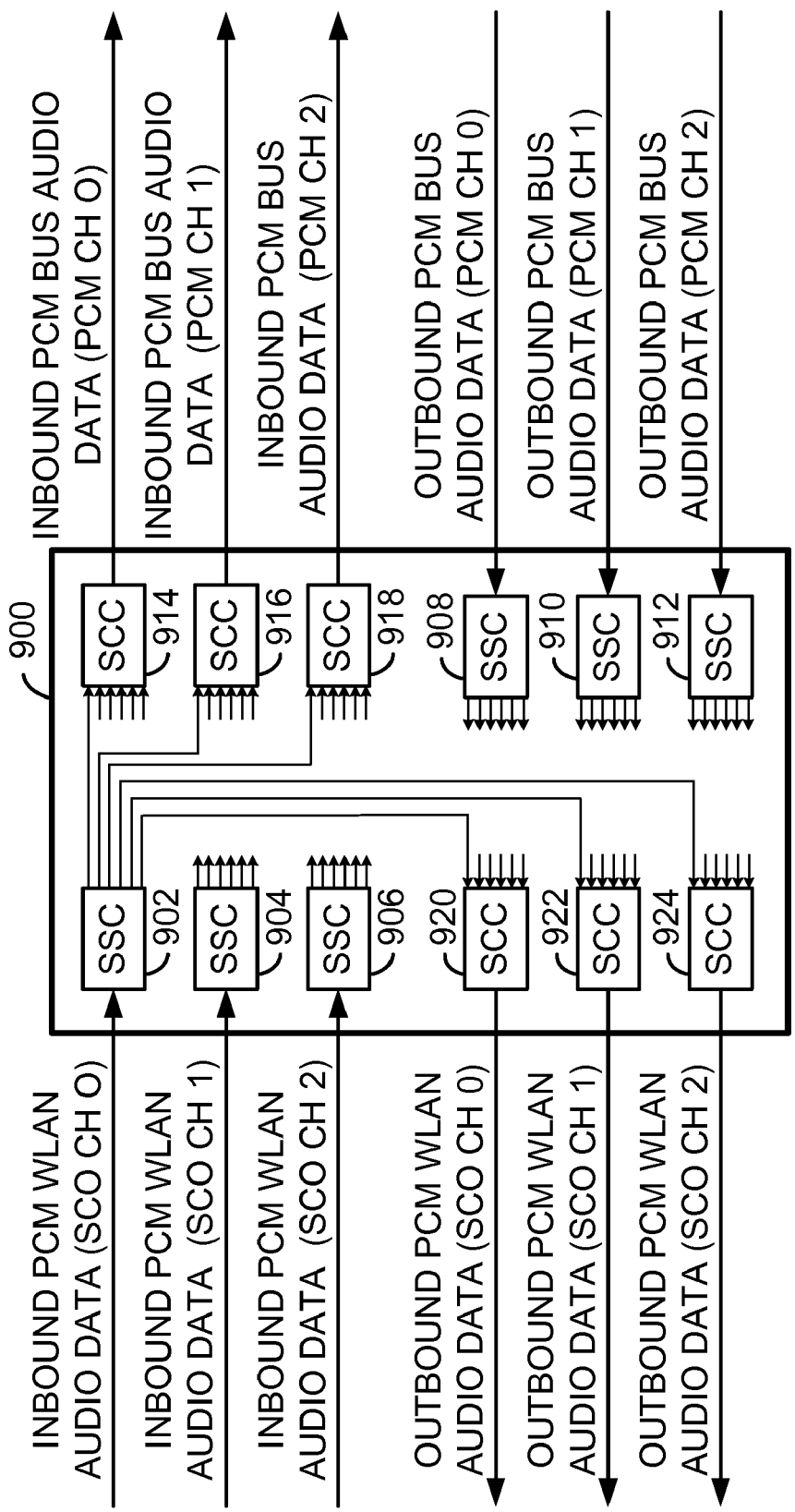
FIG. 9 is a block diagram illustrating a first embodiment of a switch box of the PCM interface of the WLAN transceiving circuit of the present invention.

FIG. 9 is a block diagram illustrating a first embodiment of a switch box of the PCM interface of the WLAN transceiving circuit of the present invention. The switch box 900 illustrated in FIG. 9 is a first embodiment of the switch box 604 illustrated in FIG. 6. The switch box 900 receives inbound PCM WLAN audio data (SCO CH 0), inbound PCM WLAN audio data (SCO CH 1), inbound PCM WLAN audio data (SCO CH 2), outbound PCM bus audio data (PCM CH 0), outbound PCM bus audio data (PCM CH 1), and outbound PCM bus audio data (PCM CH 2). These inputs make up a plurality of switch box inputs received by switch box 900. The plurality of switch box inputs are received by Signal Selection Circuitry (SSC) 902, SSC 904, SSC 906, SSC 908, SSC 910, and SSC 912, respectively. One embodiment of the SSC is shown with reference to FIG. 10.

The switch box 900 produces a plurality of switch box outputs that include outbound PCM WLAN audio data (SCO CH 0), outbound PCM WLAN audio data (SCO CH 1), outbound PCM WLAN audio data (SCO CH 2), inbound PCM bus audio data (PCM CH 0), inbound PCM bus audio data (PCM CH 1), and inbound PCM bus audio data (PCM CH 2). The plurality of switch box outputs are produced by Signal Combining Circuitry (SCC) 914, SCC 916, SCC 918, SCC 920, SCC 922, and SCC 924, respectively. One particular embodiment of the SCC is shown with reference to FIG. 11.

With the embodiment of FIG. 9, each of the SCCs 914-924 receives inputs from each of the SSCs 902-912. Each of the SSCs 902-912 controls which, if any, of the plurality of SCCs 914-924 receives its respective inputs. For example, the SSC 902 receives the inbound PCM WLAN audio data (SCO SCH 0) signal. The SSC 902 couples to each of the SCCs 914-924. However, the SSC 902 controls which of the SSCs 914-924 receives the inbound PCM WLAN audio data (SCO SCH 0) as an input. Each of the SCCs 914-924 combines all of the signals that are to it provided. For example, if the SCC 924 receives the inbound PCM WLAN audio data (SCO SCH 1) signal from SSC 904 and the outbound PCM bus audio data (PCM CH 2) from SSC 912, it will combine these inputs to produce the outbound PCM WLAN audio data (PCM CH 2).

Figure 10:
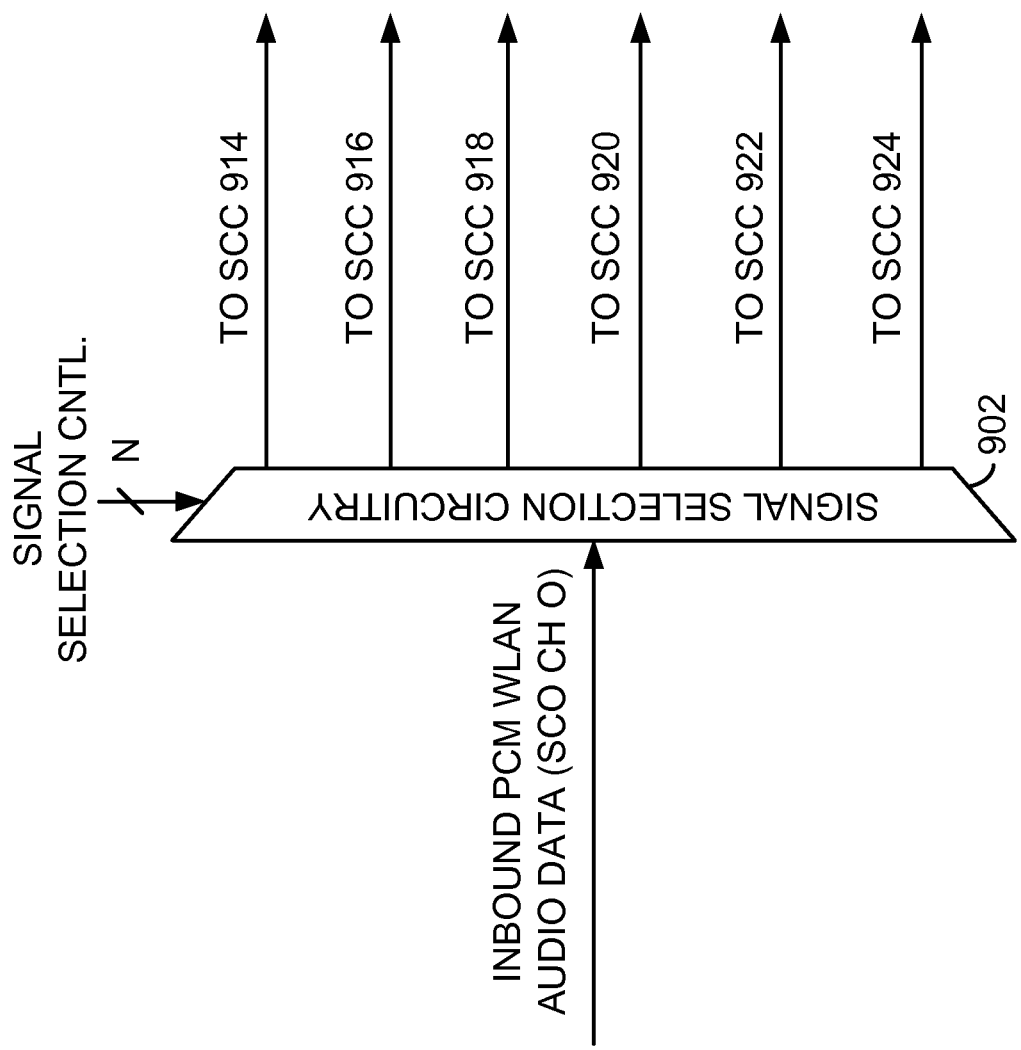
FIG. 10 is a block diagram illustrating signal selection circuitry of the first embodiment of the switch box of the PCM interface of the WLAN transceiving circuit of FIG. 9.

FIG. 10 is a block diagram illustrating signal selection circuitry of the first embodiment of the switch box of the PCM interface of the WLAN transceiving circuit of FIG. 9. As shown, the SSC 902 illustrated in FIG. 10 receives the inbound PCM WLAN audio data (SCO SCH 0) signal and may provide the inbound PCM WLAN audio data (SCO SCH 0) to none, one, more than one, or all of SCCs 914-924, depending upon a signal selection control input provided to the SSC 902. Each other of the SSCs 904-914 has similar/identical structure as that of SSC 902 but routes correspondingly different input signals (as illustrated in detail in FIG. 9).

Figure 11:
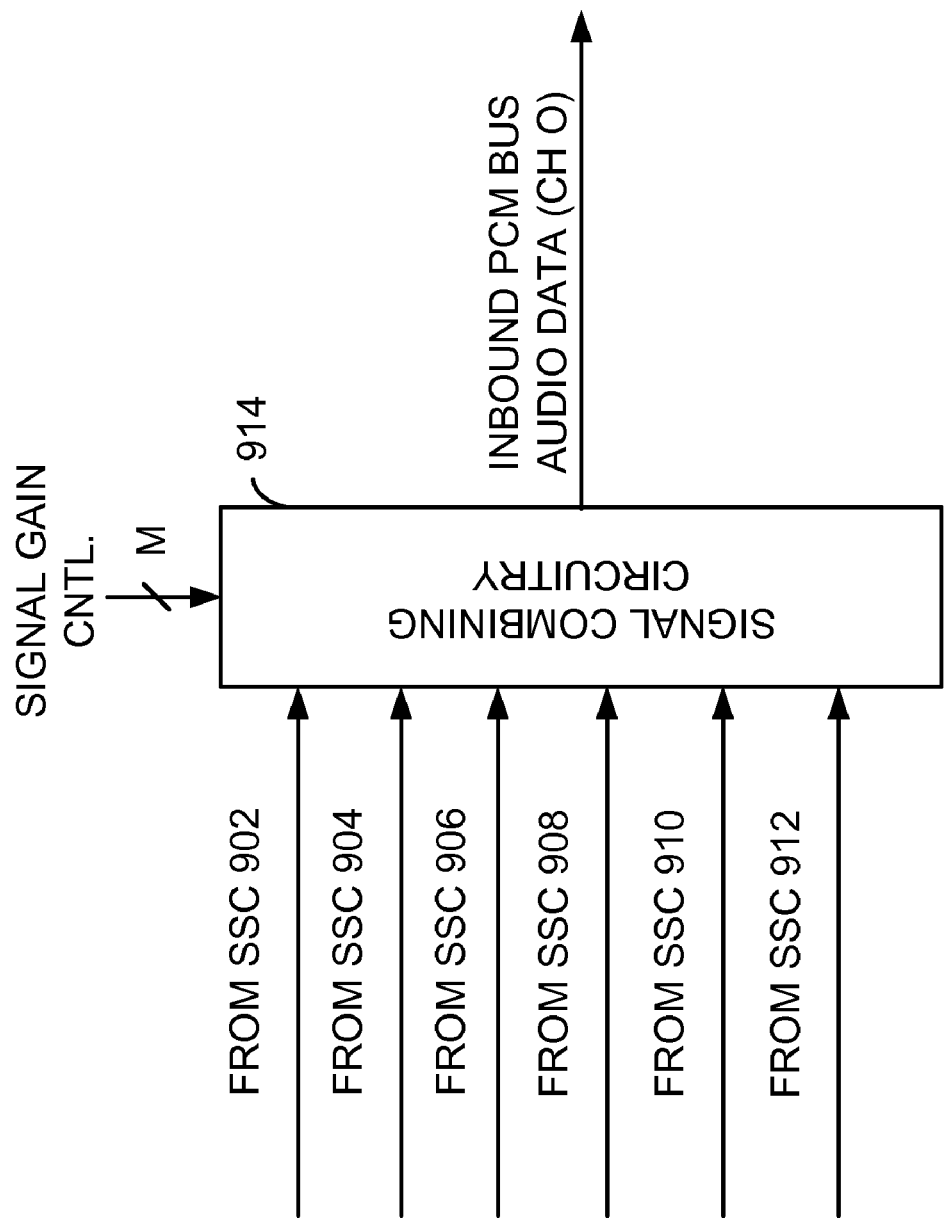
FIG. 11 is a block diagram illustrating signal combining circuitry of the first embodiment of the switch box of the PCM interface of the WLAN transceiving circuit of FIG. 9.

FIG. 11 is a block diagram illustrating signal combining circuitry of the first embodiment of the switch box of the PCM interface of the WLAN transceiving circuit of FIG. 9. The SCC 914 receives inputs from each of the SSCs 902-912. In such case, the input received from each of the SSCs 902-912 will be the respective signal as indicated in FIG. 9 or zero. Based upon a signal gain control signal the SCC 914 combines the signals that are to it provided. The gain control signal indicates gain controls that are applied to the inputs, if any, prior to combining the gain adjusted inputs. The gain control signal may require that some of the inputs to the SCC 914 be scaled prior being combined with the other inputs to the SCC 914 to produce the output, the inbound PCM bus audio data (CH 0). Such gain control may be required to equalize the audio data level during call conferencing, for example, to mute some of the inbound audio data, to combine background music with an ongoing call, and for other reasons.

Because each of the SSCs 902-912 and each of the SCCs 914-924 operate upon digital audio data in a PCM format, each of the SSCs 902-912 and the SCCs 914-924 performs digital operations. The SSCs 902-912 therefore operate to digitally route the input PCM format data to the SCCs 914-924. Further, the SCCs 914-924 operate to digitally combine the PCM format data that it receives. The selective routing and the selective combining of digital signals is generally known and will not be described further herein.

Referring to FIGS. 1, 6, 7 and 9, a first example of the operation of the switch box 900 and its components are described in which a serviced call is placed on hold (see steps 704-710 of FIG. 7). The wireless headset 130 services a call with landline phone 134 via SCO CH 0 (this call may be with a remote voice with the landline phone 134 being an intermediate device). The wireless headset 130 receives inbound audio information from landline phone 134 as inbound PCM WLAN audio data (SCO CH 0) at SSC 902 of switch box 900 and couples the inbound PCM WLAN audio data (SCO CH 0) to SCC 914. The SCC 914, after optional gain control, produces the inbound PCM bus audio data (PCM CH 0). The coupled DAC 612 of the audio CODEC 314 receives the inbound PCM bus audio data (PCM CH 0) and converts the inbound PCM bus audio data (PCM CH 0) to an analog audio signal that is presented to the user as an audio signal via speaker 318.

Microphone 316 receives an audio signal from the user and produces an analog audio signal that it provides to an ADC 614 of the audio CODEC 314. The audio CODEC 314 produces the outbound PCM bus audio data (PCM CH 0). The switch box 900 receives the outbound PCM bus audio data (PCM CH 0) at SSC 908 and routes the outbound PCM bus audio data (PCM CH 0) to SCC 920. SCC 920, after optional gain control, produces the outbound PCM WLAN audio data (SCO CH 0). The outbound PCM WLAN audio data (SCO CH 0) is wirelessly transmitted to the landline phone 134 via the wireless interface.

During the hold operation, the operation of the SSC 902 and the SSC 908 are controlled so that they do not pass the above-described signals and, resultantly, the call is placed on hold. Even during this hold operation, SCO CH 0 still services the call even though the audio information carried thereon is silent. This hold operation may be initiated via a button depression on the headset 130 or via other control input. To remove the call from hold, a similar button depression on the headset 130 or other control input may be provided, such as that described with reference to step 710 of FIG. 7.

In muting operations, such as those described with reference to step 722, the inbound audio information, e.g., inbound WLAN audio data (SCO CH 0) is routed out of the switch box 600 as PCM bus audio data (PCM CH 0) via SSC 902 and SCC 914. However, the outbound audio information, e.g., outbound PCM bus audio data (PCM CH 0), is not routed via SSC 908 to SCC 920 via appropriate signal selection control input. With these muting operations, the user of the wireless headset 130 hears the inbound audio information but the outbound audio information is silenced.

Referring to FIGS. 2A, 6, 7 and 9, a second example of the operation of the switch box 900 and its components is described in which wireless headset 204 performs call conferencing (see steps 712-720 of FIG. 7). In a call conferencing operation, multiple wireless channels are required to communicate with multiple other wireless devices. In the example of FIG. 2A, wireless headset 204 performs call conferencing for WAP 202, wireless headset 208, and wireless headset 210, referred to jointly as "other wireless devices". In such case, one of three wireless channels is employed to communicate with each of WAP 202, wireless headset 208, and wireless headset 210, e.g., channels corresponding to SCO 0, SCO 1, and SCO 2, respectively. The wireless headset 204, via its switch box 900, services the call conferencing.

With particular reference to FIG. 9, inbound packetized audio data, from WAP 202, wireless headset 208, and wireless headset 210, is received by wireless headset 204 on respective WLAN channels and converted by the transcoder to inbound PCM WLAN audio data (SCO CH 0), inbound PCM WLAN audio data (SCO CH 1), AND inbound PCM WLAN audio data (SCO CH 2), respectively. Each of the inbound packetized audio data streams includes only the audio information of its respective other wireless device. Audio information from the user of the wireless headset 204 is received by the microphone 614 and converted to the outbound PCM bus audio data (PCM CH 0) by the ADC 614 of the audio CODEC 314.

In order to present all of the audio information to the user of wireless headset 204, including his/her own audio information, the switch box 900 combines all of the inbound PCM WLAN audio data (SCO CH 0), inbound PCM WLAN audio data (SCO CH 1), inbound PCM WLAN audio data (SCO CH 2), and outbound PCM bus audio data (PCM CH 0) via SSCs 902, 904, 906, and 908 and SCC 914 to produce inbound PCM bus audio data (PCM CH 0) that is presented to the user of the wireless headset 204. The combined output is presented to the user of the wireless headset 204 as inbound PCM bus audio data (PCM CH 0).

In order to provide the call conferencing service to the other wireless devices, the switch box 900 selectively combines the inbound PCM WLAN audio data (SCO CH 0), inbound PCM WLAN audio data (SCO CH 1), inbound PCM WLAN audio data (SCO CH 2) and outbound PCM bus audio data (PCM CH 0) and provides this combined audio information to each of the other wireless devices. For example to service call conferencing for WAP 202 (that services a remote telephone via its coupled infrastructure), the switch box 900 combines the inbound PCM WLAN audio data (SCO CH 0), inbound PCM WLAN audio data (SCO CH 1), inbound PCM WLAN audio data (SCO CH 2) and outbound PCM bus audio data (PCM CH 0) via SSCs 902, 904, 906, and 908 and SCC 920. In servicing call conferencing for wireless headset 208, the switch box 900 combines the inbound PCM WLAN audio data (SCO CH 0), inbound PCM WLAN audio data (SCO CH 1), inbound PCM WLAN audio data (SCO CH 2) and outbound PCM bus audio data (PCM CH 0) via SSCs 902, 904, 906, and 908 and SCC 922. Finally, in servicing call conferencing for wireless headset 210, the switch box 900 combines the inbound PCM WLAN audio data (SCO CH 0), inbound PCM WLAN audio data (SCO CH 1), inbound PCM WLAN audio data (SCO CH 2) and outbound PCM bus audio data (PCM CH 0) via SSCs 902, 904, 906, and 908 and SCC 924.

In some cases, the inbound audio information from a particular other wireless device is not returned to the particular other wireless device to avoid echoing within the particular other wireless device. In such case, the operation of the respective SSC is modified such that the inbound audio information is not returned to the serviced other wireless device. For example, in order to avoid echoing in the device serviced by the WAP 202, the inbound PCM WLAN audio data (SCO CH 0) may not be provided to SCC 920.

With the call waiting (steps 730-736) and call forwarding (steps 738-744) operations described with reference to FIG. 7, multiple wireless channels are also required to communicate with multiple other wireless devices. For call waiting, one serviced call may be placed on hold while a new inbound call is serviced. In such case, the switch box 900 operates so that inbound and outbound audio information is not routed. For example, if a call is currently being serviced with another wireless device via SCO CH 0, the switch box 900 simply stops the routing of inbound PCM WLAN audio data (SCO CH 0) and outbound PCM bus audio data (PCM CH 0) when call waiting is initiated. Then, a new call on SCO CH 1 is serviced by the switch box 900 via inbound PCM WLAN audio data (SCO CH 1) and outbound PCM WLAN audio data (SCO CH 1) using appropriate SSC and SCC settings.

In call forwarding operations, the switch box 900 routes audio information between serviced WLAN channels, e.g., inbound PCM WLAN audio data (SCO CH 0) is routed to outbound PCM WLAN audio data (SCO CH 1) and inbound PCM WLAN audio data (SCO CH 1) is routed to outbound PCM WLAN audio data (SCO CH 0). This routing by the switch box enables call forwarding between SCH CH 0 and SCO CH 1.

Figure 12:
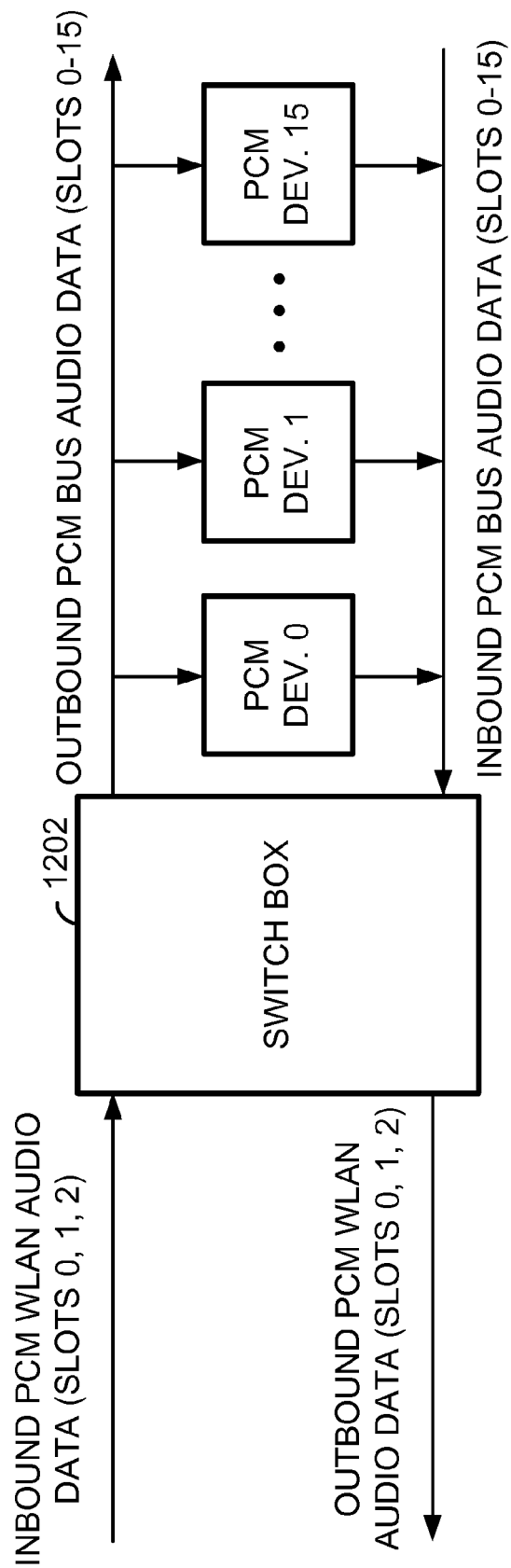
FIG. 12 is a block diagram illustrating a second embodiment of a switch box of the PCM interface of the WLAN transceiving circuit of the present invention.

FIG. 12 is a block diagram illustrating a second embodiment of a switch box of the PCM interface of the WLAN transceiving circuit of the present invention. The switch box 1202 of FIG. 12 is an embodiment of the switch box 604 of FIG. 6 in which all of the inbound PCM WLAN audio data, the outbound PCM WLAN audio data, THE inbound PCM bus audio data, and the outbound PCM bus audio data are Time Division Multiplexed (TDM). In the illustrated embodiment, the WLAN I/F 402 supports three WLAN channels. Thus, the inbound PCM WLAN audio data and the outbound PCM WLAN audio data occupy up to three TDM PCM slots each, each of the TDM PCM slots corresponding to a respective WLAN channel. Further, in the illustrated embodiment, the TDM PCM bus supports 16 slots, slots 0-15. Thus, up to 16 TDM PCM devices may couple to the switch box 1202 via the TDM PCM bus. These TDM PCM devices are illustrated as PCM dev. 1, PCM dev. 2, ..., PCM dev. 15. These TDM PCM devices may include audio CODECs, Digital Signal Processors (DSPs), and other devices that operate upon audio information.

Figure 13:
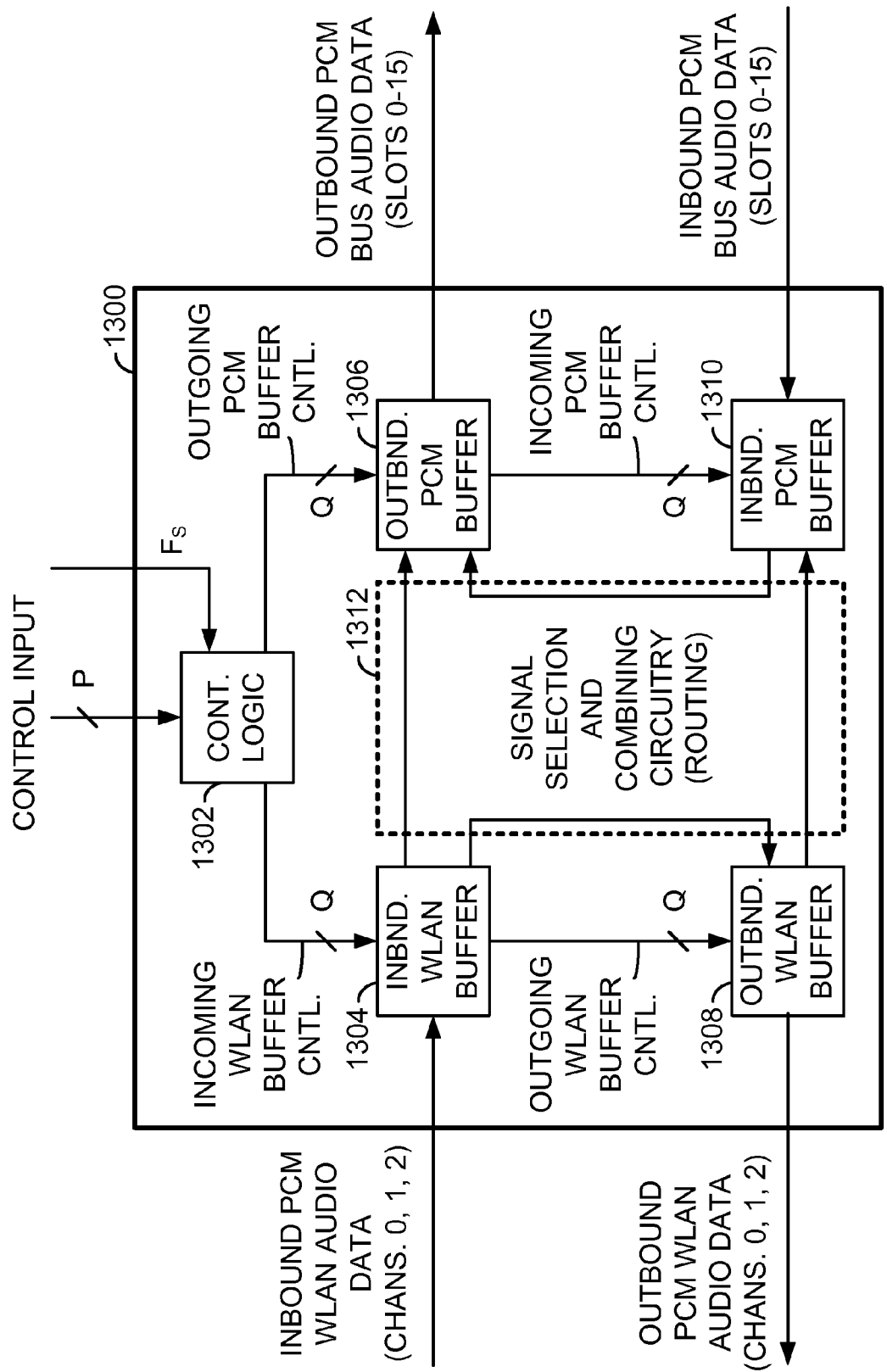
FIG. 13 is a block diagram illustrating in more detail the second embodiment of the switch box of FIG. 12.

FIG. 13 is a block diagram illustrating in more detail the second embodiment of the switch box 1202 of FIG. 12. The switch box 1202 includes control logic 1302 that receives the PCM synchronization pulses, FS, and a control input. The switch box 1202 also includes an inbound WLAN buffer 1304, an outbound PCM buffer 1306, an outbound WLAN buffer 1308, and an inbound PCM buffer 1310. The switch box 1202 may also include signal selection and combining circuitry 1312 that provides a routing function.

The inbound WLAN buffer 1304 receives inbound PCM WLAN audio data (SCO CH 0), inbound PCM WLAN audio data (SCO CH 1), and inbound PCM WLAN audio data (SCO CH 2). The inbound PCM buffer 1310 receives inbound PCM bus audio data on slots 0-15 from the TDM PCM BUS. Based upon control commands from the control logic 1302, the inbound WLAN buffer 1304 routes the WLAN audio information to the outbound PCM buffer 1306 and the outbound WLAN buffer 1308 via the routing circuitry 1312. Note that the functionality of the routing circuitry 1312 may be built into the inbound WLAN buffer 1304, inbound PCM buffer 1310, the outbound PCM buffer 1306, and/or the outbound WLAN buffer 1308. In such case, the signal selection and combining circuitry 1312 is simply a set of connections between these components.

Based upon control commands, the inbound PCM buffer 1310 routes the PCM BUS audio data to the outbound PCM buffer 1306 and to the outbound WLAN buffer 1308. According to the embodiment of the switch box 1202 of FIG. 12, TDM PCM data that is received on one inbound slot may be switched so that it departs on a different outbound TDM PCM slot. This teaching will be further described with reference to FIG. 13. Further, the switch box 1202 may include Signal Selection and Combining Circuitry (SSCC) 1312 that combines the inbound signals to produce the outbound signals. The operation of the switch box 1202 produces results similar to the results produced by the switch box 900 of FIG. 9 in that signals are selectively combined. However, the switch box 1202 of FIG. 12 operates to digitally combine TDM PCM data from differing TDM PCM slots and to write the combined signals to other still differing TDM PCM slots.

For example, the switch box 1202 may operate to combine inbound PCM WLAN audio data (Ch. 0), inbound PCM WLAN audio data (Ch. 1), and inbound PCM bus audio data (SLOT 7) to produce a digitally combined signal. The switch box 1202 may output this combined signal on the TDM PCM bus in slot 0 data so that it may be presented to a user. Further, the switch box 1202 may also write this digitally combined signal on each of output channels 0, 1, and 2. Such operation may be performed for call conferencing operations.

Figure 14:
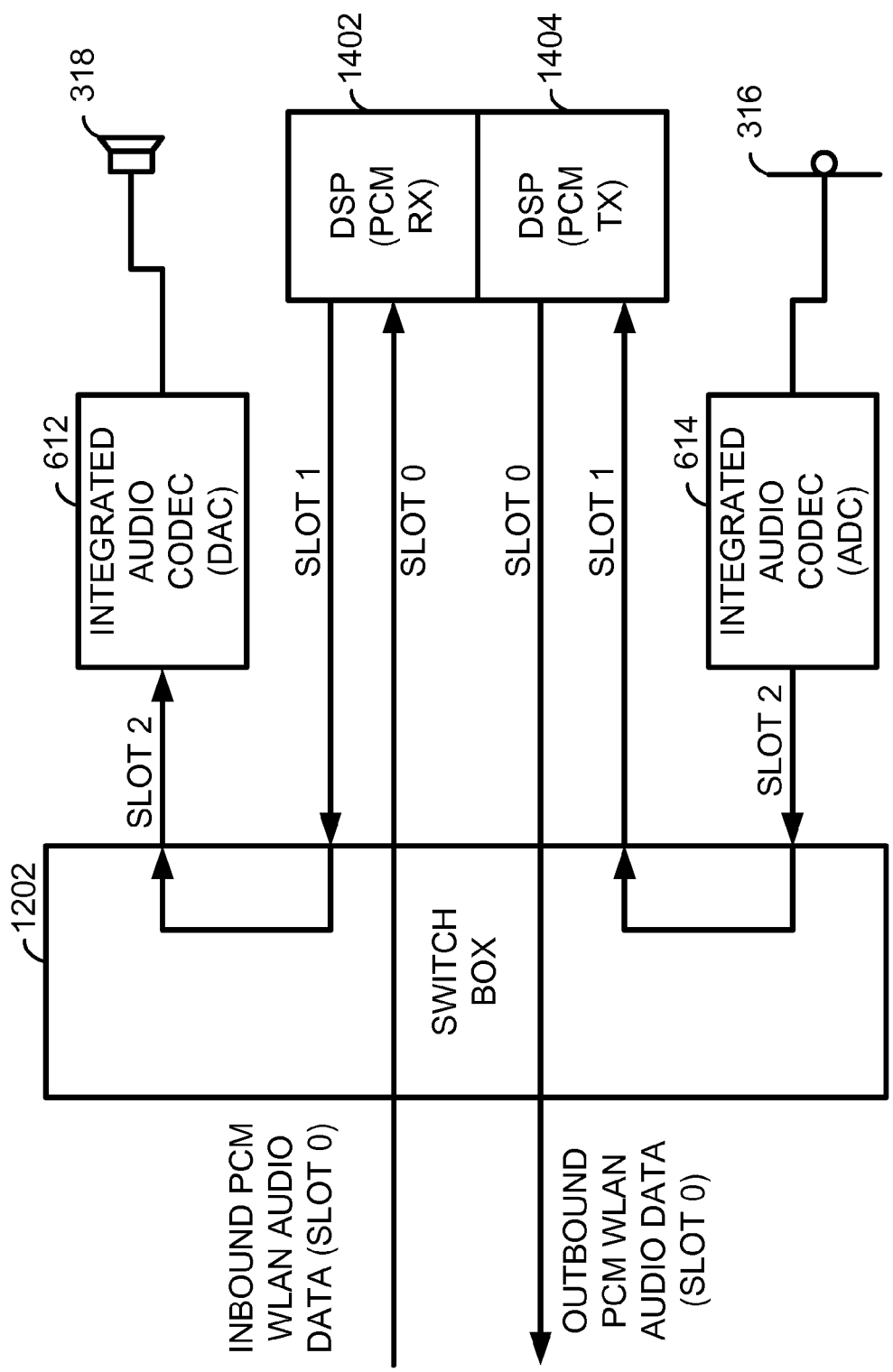
FIG. 14 is a block diagram illustrating the manner in which the switch box of FIG. 12 operates to process audio data.

FIG. 14 is a block diagram illustrating the manner in which the switch box 1202 of FIG. 12 operates to process audio data. As illustrated, the switch box 1202 receives inbound PCM WLAN audio data (SLOT 0) and outputs this audio information as inbound PCM bus audio data (SLOT 0). A coupled RX DSP receives the audio information on slot 0, processes the audio information, and provides the processed audio information to the switch box 1202 as outbound PCM bus audio data (SLOT 1). The switch box 1202 then turns this processed audio information around as inbound PCM bus audio data (SLOT 2) that is received by audio CODEC 612 and presented to a user via speaker 318.

Likewise, microphone 316 receives audio information from a user, converts the audio information to an analog audio signal, and provides the analog audio signal to the audio CODEC 614. The audio CODEC 614 outputs the audio information as outbound PCM bus audio data (SLOT 2) to the switch box 1202. The switch box 1202 turns the audio information contained in outbound PCM bus audio data (SLOT 2) around as inbound PCM bus audio data (SLOT 1). A coupled TX DSP 1404 receives the audio information via inbound PCM bus audio data (SLOT 1) to produce processed audio information. The TX DSP 1404 then outputs the processed audio information as outbound PCM bus audio data (SLOT 0) to the switch box 1202. The switch box 1202 then outputs the processed audio information received as outbound PCM bus audio data (SLOT 0) as outbound PCM WLAN audio data (SLOT 0).

Because the switch box 1202 alters the slot position of the audio information that it routes, it must ensure that all output audio information is time synchronized. In order to do this, the switch box 1202 may have to buffer audio information for a TDM frame.

Figure 15:
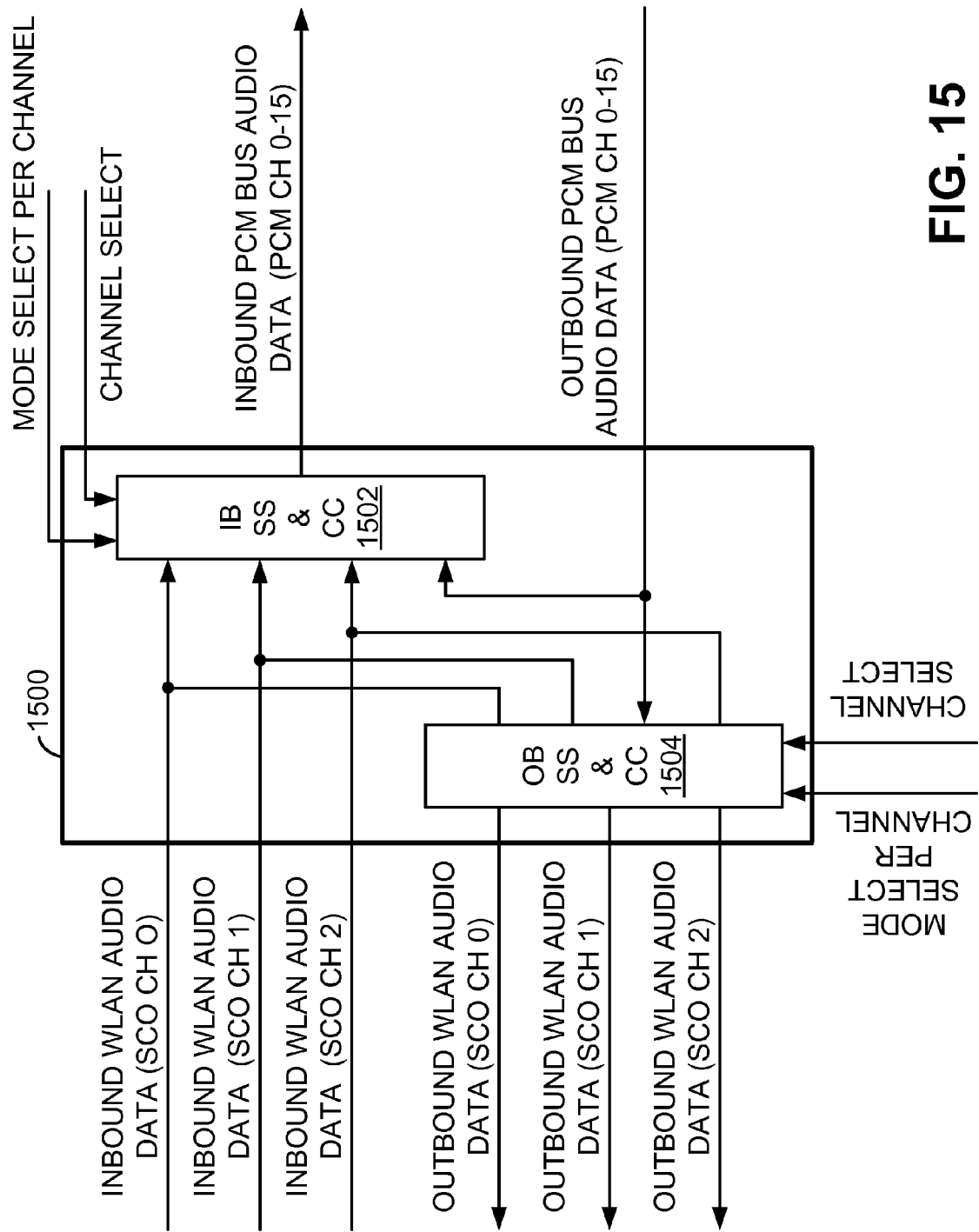
FIG. 15 is a block diagram illustrating yet another embodiment of the switch box of the present invention.

FIG. 15 is a block diagram illustrating yet another embodiment of the switch box 1500 of the present invention. As shown, the switch box 1500 includes inbound signal selection and combining circuitry 1502 and outbound signal selection and combining circuitry 1504.

The inbound signal selection and combining circuitry 1502 receives the inbound WLAN audio data and the outbound PCM bus audio data. Each of the inputs to the inbound signal selection and combining circuitry 1502 may be received in a time divided format on a single line or may be received in a non-time divided format on multiple lines. The inbound signal selection and combining circuitry 1502 produces as its output the inbound PCM bus audio data, which may be produced in a time divided format on a single line or may be produced in a non-time divided format on multiple lines. The manner in which the inbound signal selection and combining circuitry 1502 produces its output is based upon the mode select per channel and channel select inputs it receives.

The outbound signal selection and combining circuitry 1504 receives the inbound WLAN audio data and the outbound PCM bus audio data. Each of the inputs to the outbound signal selection and combining circuitry 1504 may be received in a time divided format on a single line or may be received in a non-time divided format on multiple lines. The outbound signal selection and combining circuitry 1504 produces as its output the outbound WLAN audio data, which may be produced in a time divided format on a single line or may be produced in a non-time divided format on multiple lines. The manner in which the outbound signal selection and combining circuitry 1502 produces its output is based upon the mode select per channel and channel select inputs it receives.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

The invention claimed is:

1. A wireless transceiving integrated circuit that services voice communications in a wireless network with at least one wireless device, the wireless transceiving integrated circuit comprising:
    a wireless interface that wirelessly communicates with the at least one wireless device to receive inbound packetized audio data from the at least one wireless device and to transmit outbound packetized audio data to the at least one wireless device;
    a transcoder operably coupled to the wireless interface, wherein the transcoder receives the inbound packetized audio data and converts the inbound packetized audio data to inbound Pulse Code Modulated (PCM) audio data, and wherein the transcoder receives outbound PCM audio data and converts the outbound PCM audio data to the outbound packetized audio data; and
    a switch box operably coupled between the transcoder and a PCM bus, the switch box including:
        a plurality of switch box inputs that receive the inbound PCM audio data and outbound PCM bus audio data;
        a plurality of switch box outputs that produce the outbound PCM audio data and the inbound PCM bus audio data; and
        signal selection and combining circuitry operably coupled to the plurality of switch box inputs and to the plurality of switch box outputs that controllably combines at least two switch box inputs of the plurality of the switch box inputs to produce one switch box output of the plurality of switch box outputs.

2. The wireless transceiving integrated circuit of claim 1, further comprising:
    an input buffer operably coupled to the transcoder and to the wireless interface, wherein the input buffer receives the inbound packetized audio data from the wireless interface and provides the inbound packetized audio data to the transcoder; and
    an output buffer operably coupled to the transcoder and to the wireless interface, wherein the output buffer receives the outbound packetized audio data from the transcoder and provides the outbound packetized audio data to the wireless interface.

3. The wireless transceiving integrated circuit of claim 1, wherein:
    the at least one wireless device comprises a first wireless device and a second wireless device; and
    the wireless transceiving integrated circuit enables call conferencing between the first wireless device, the second wireless device, and a wireless device that contains the wireless transceiving integrated circuit.

4. The wireless transceiving integrated circuit of claim 3, wherein:
    the inbound packetized audio data includes first inbound packetized audio data respective to the first wireless device and second inbound packetized audio data respective to the second wireless device;
    the outbound packetized audio data includes first outbound packetized audio data respective to the first wireless device and second outbound packetized audio data respective to the second wireless device; and
    the switch box combines PCM audio data corresponding to the first inbound packetized audio data with PCM audio data corresponding to the second inbound packetized audio data to produce a switch box output of the plurality of switch box outputs.

5. The wireless transceiving integrated circuit of claim 4, wherein the switch box further combines PCM audio data received from a coupled audio COder/DECoder (CODEC) with PCM audio data corresponding to the first inbound packetized audio data and with PCM audio data corresponding to the second inbound packetized audio data to produce the switch box output of the plurality of switch box outputs.

6. The wireless transceiving integrated circuit of claim 1, further comprising:

an audio COder/DECoder (CODEC) operably coupled to a switch box output of the plurality of switch box output, wherein the audio CODEC converts the inbound PCM audio data to analog audio data; and a speaker that receives the analog audio data and converts the analog audio data to an audio signal that is presented to a user.

7. The wireless transceiving integrated circuit of claim 1, further comprising:
a microphone that receives an outbound audio signal from a user and that converts the outbound audio signal to an outbound analog audio signal;
an audio COder/DECoder (CODEC) operably coupled to the microphone that converts the outbound analog audio signal to outbound PCM audio data;
wherein the switch box receives the outbound PCM audio data from the audio CODEC and couples the outbound PCM audio data to the transcoder as the outbound PCM audio data;
wherein the transcoder converts the outbound PCM audio data to outbound packetized audio data; and
an output buffer that operably couples to the transcoder and to the wireless interface, that receives the outbound packetized audio data from the transcoder, and that provides the outbound packetized audio data to the wireless interface.

8. The wireless transceiving integrated circuit of claim 1, wherein the wireless interface supports the Bluetooth Specification.

9. The wireless transceiving integrated circuit of claim 1, wherein the wireless interface supports one or more versions of the IEEE 802.11 standards.

10. The wireless transceiving integrated circuit of claim 1, wherein the signal selection and combining circuitry comprises:
signal selection circuitry operably coupled to the plurality of switch box inputs; and
signal combining circuitry operably coupled to the signal selection circuitry and to the plurality of switch box outputs.

11. The wireless transceiving integrated circuit of claim 1, wherein in controllably combining at least two switch box inputs of the plurality of the switch box inputs to produce one switch box output of the plurality of switch box outputs, the wireless transceiving integrated circuit performs call conferencing.

12. The wireless transceiving integrated circuit of claim 1, wherein in controllably combining at least two switch box inputs of the plurality of the switch box inputs to produce one switch box output of the plurality of switch box outputs, the wireless transceiving integrated circuit performs call forwarding.

13. A method for servicing a call in a wireless network with at least one other wireless device, the method comprising:
receiving first inbound packetized audio data from a first wireless device of the at least one other wireless device;
converting the first inbound packetized audio data to first inbound Pulse Code Modulated (PCM) audio data;
receiving second inbound packetized audio data from a second wireless device of the at least one other wireless device;
converting the second inbound packetized audio data to second inbound PCM audio data; and
controllably combining the first inbound PCM audio data with the second inbound PCM audio data to produce inbound PCM audio data.

14. The method of claim 13, further comprising:
converting the inbound PCM audio data to an analog audio signal;
converting the analog audio signal to an audio signal; and
presenting the audio signal to a user.

15. The method of claim 13, wherein the packetized audio data is in a Bluetooth Specification data format.

16. The method of claim 13, wherein the packetized audio data is in a data format consistent one or more versions of the IEEE 802.11 standards.

17. The method of claim 13, further comprising:
receiving an outbound audio signal from a user;
converting the outbound audio signal to an outbound analog audio signal;
converting the outbound analog audio signal to outbound PCM audio data;
controllably combining the outbound PCM audio data with at least one of the first inbound PCM audio data and the second inbound PCM audio data to produce outbound PCM audio data;
converting the outbound PCM audio data to outbound packetized audio data; and
transmitting the outbound packetized audio data to the at least one other wireless device.

18. The method of claim 13, wherein in controllably combining the first inbound PCM audio data with the second inbound PCM audio data to produce inbound PCM audio data, call conferencing operations are performed.

19. The method of claim 13, wherein in controllably combining the first inbound PCM audio data with the second inbound PCM audio data to produce inbound PCM audio data, call forwarding operations are performed.

20. A wireless network transceiving integrated circuit that services voice communications in a wireless network with at least one wireless device, the wireless transceiving integrated circuit comprising:
means for receiving first inbound packetized audio data from a first wireless device of the at least one other wireless device;
means for converting the first inbound packetized audio data to first inbound Pulse Code Modulated (PCM) audio data;
means for receiving second inbound packetized audio data from a second wireless device of the at least one other wireless device;
means for converting the second inbound packetized audio data to second inbound PCM audio data; and
means for controllably combining the first inbound PCM audio data with the second inbound PCM audio data to produce inbound PCM bus audio data.

* * * * *